(12) United States Patent
Miyajima et al.

(10) Patent No.: US 11,735,752 B2
(45) Date of Patent: Aug. 22, 2023

(54) FUEL CELL SYSTEM AND METHOD OF LOW TEMPERATURE STARTING OF FUEL CELL SYSTEM

(71) Applicant: HONDA MOTOR CO., LTD., Tokyo (JP)

(72) Inventors: Kazuyoshi Miyajima, Wako (JP); Naoki Imai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 17/668,485

(22) Filed: Feb. 10, 2022

(65) Prior Publication Data

US 2022/0302481 A1    Sep. 22, 2022

(30) Foreign Application Priority Data

Mar. 18, 2021 (JP) .................. 2021-044431

(51) Int. Cl.
| | |
|---|---|
| *H01M 8/04* | (2016.01) |
| *H01M 8/04223* | (2016.01) |
| *H01M 8/0284* | (2016.01) |
| *H01M 8/04014* | (2016.01) |

(52) U.S. Cl.
CPC ..... *H01M 8/04268* (2013.01); *H01M 8/0284* (2013.01); *H01M 8/04014* (2013.01); *H01M 2250/20* (2013.01)

(58) Field of Classification Search
CPC ........... H01M 8/04268; H01M 8/0284; H01M 8/04014; H01M 8/0276; H01M 2250/20
USPC ....................................................... 429/429
See application file for complete search history.

(56) References Cited

U.S. PATENT DOCUMENTS

| | | | |
|---|---|---|---|
| 2007/0218328 A1* | 9/2007 | Osada ............... | H01M 8/04014 429/513 |
| 2008/0088043 A1* | 4/2008 | Daisuke ............ | H01M 8/04761 261/130 |
| 2013/0089799 A1* | 4/2013 | Reuber ................. | B25B 27/304 429/423 |
| 2013/0149618 A1* | 6/2013 | Hatano ............. | H01M 8/04708 429/414 |
| 2018/0226662 A1* | 8/2018 | Yang .................... | H01M 8/0276 |
| 2019/0088919 A1* | 3/2019 | Xi ........................ | H01M 8/0271 |
| 2019/0207231 A1* | 7/2019 | Izu ...................... | H01M 8/04014 |
| 2019/0252713 A1* | 8/2019 | Satake ................ | H01M 8/2457 |
| 2020/0328431 A1* | 10/2020 | Xi ....................... | H01M 8/0278 |

(Continued)

FOREIGN PATENT DOCUMENTS

JP    2008-059922 A    3/2008

*Primary Examiner* — James M Erwin
(74) *Attorney, Agent, or Firm* — Carrier, Shende & Associates P.C.; Joseph P. Carrier; Fulchand P. Shende

(57) ABSTRACT

In a fuel cell system, a first rubber seal is interposed between a top part of a first seal bead portion that is formed to protrude toward a first separator main body, and a membrane electrode assembly member. A method of low temperature starting of the fuel cell system includes: a warm-up step of warming up a fuel cell stack by introducing an oxygen containing gas discharged from a compressor, into a case interior space in a state in which a temperature of the oxygen containing gas is raised by causing the oxygen containing gas to flow through a pressure loss member; and an electrical power generating step of initiating generation of electrical power after completion of the warm-up step.

17 Claims, 18 Drawing Sheets

(56) References Cited

U.S. PATENT DOCUMENTS

2021/0075034 A1\* 3/2021 Irie ................... H01M 8/04761
2021/0351421 A1\* 11/2021 Wenzel ............... H01M 8/0284

\* cited by examiner

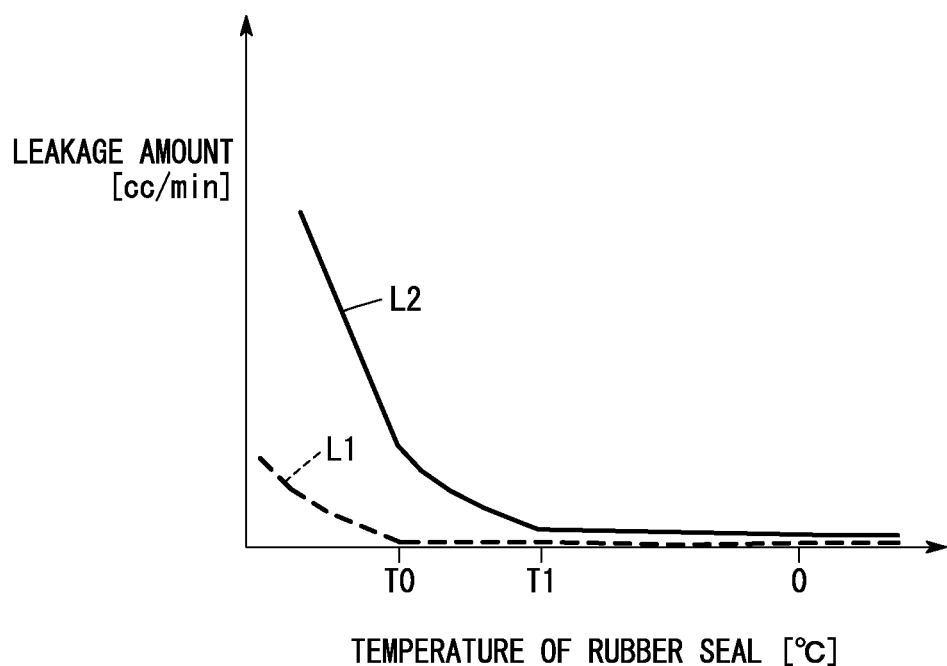

FUEL CELL SYSTEM AND METHOD OF LOW TEMPERATURE STARTING OF FUEL CELL SYSTEM

CROSS-REFERENCE TO RELATED APPLICATIONS

This application is based upon and claims the benefit of priority from Japanese Patent Application No. 2021-044431 filed on Mar. 18, 2021, the contents of which are incorporated herein by reference.

BACKGROUND OF THE INVENTION

Field of the Invention

The present invention relates to a fuel cell system and a method of low temperature starting of a fuel cell system.

Description of the Related Art

A fuel cell system is equipped with a fuel cell stack. The fuel cell stack includes a plurality of power generation cells stacked on each other. Each of the power generation cells includes an MEA (membrane electrode assembly) member and a pair of metal separators. The MEA member is arranged between the pair of metal separators. The MEA member generates electrical power by electrochemical reactions that take place between an oxygen containing gas and a fuel gas. The fuel cell system includes an oxygen containing gas supply flow path for supplying the oxygen containing gas to the fuel cell stack. A compressor is provided in the oxygen containing gas supply flow path.

For example, in JP 2008-059922 A, it is disclosed that, in the case that a temperature of the fuel cell stack is less than or equal to a predetermined temperature (for example, less than or equal to 0° C.), a relatively high temperature oxygen containing gas discharged from the compressor is supplied to the interior of the fuel cell stack to thereby warm up the fuel cell stack.

SUMMARY OF THE INVENTION

Incidentally, each of the metal separators includes a seal bead portion for preventing leakage of a fluid which is an oxygen containing gas, a fuel gas, or a coolant. The seal bead portion is integrally formed with the metal separator in a manner so as to protrude from the metal separator toward the MEA member. A rubber seal may be interposed between a top part of the seal bead portion and the MEA member. In such a rubber seal, there is a tendency for the fuel gas to easily leak at a time of low temperature. Therefore, in such a fuel cell system, there is a possibility that a small amount of the fuel gas may leak out from the rubber seal at a time when the power generation cells generate electrical power in a low temperature environment.

The present invention has the object of solving the aforementioned problem.

A first aspect of the present invention is characterized by a fuel cell system, including a fuel cell stack including a cell stack body including a plurality of power generation cells stacked together, power generation cells each containing an MEA (membrane electrode assembly) member configured to generate electrical power due to an electrochemical reaction between an oxygen containing gas and a fuel gas, and two separator members arranged on both sides of the MEA member, a stack case in which the fuel cell stack is accommodated, an oxygen containing gas supply flow path configured to supply the oxygen containing gas to the fuel cell stack, and a compressor disposed in the oxygen containing gas supply flow path, wherein each of the two separator members includes a metal separator main body, the separator main body is integrally formed with a seal bead portion in order to prevent leakage of a fluid, which is the oxygen containing gas, the fuel gas, or a coolant, the seal bead portion protrudes from the separator main body in a stacking direction of the plurality of power generation cells, and a rubber seal is interposed between a top part of the seal bead portion and the MEA member, the fuel cell system further including a warm-up introduction passage configured to introduce the oxygen containing gas, which is discharged from the compressor into the oxygen containing gas supply flow path, into a case interior space between the stack case and the fuel cell stack, and a switching unit configured to switch between a first state in which supply of the oxygen containing gas from the oxygen containing gas supply flow path into the fuel cell stack is permitted, together with blocking introduction of the oxygen containing gas from the oxygen containing gas supply flow path into the case interior space via the warm-up introduction passage, and a second state in which supply of the oxygen containing gas from the oxygen containing gas supply flow path into the fuel cell stack is blocked, together with permitting introduction of the oxygen containing gas from the oxygen containing gas supply flow path into the case interior space via the warm-up introduction passage, wherein a pressure loss member configured to cause a loss in pressure of the oxygen containing gas flowing through the warm-up introduction passage to be increased is installed in the warm-up introduction passage.

A second aspect of the present invention is characterized by a fuel cell system including a fuel cell stack including a cell stack body including a plurality of power generation cells stacked together, the power generation cells each containing an MEA (membrane electrode assembly) member configured to generate electrical power due to an electrochemical reaction between an oxygen containing gas and a fuel gas, and two separator members arranged on both sides of the MEA member, a first end plate disposed on one end of the cell stack body, and a second end plate disposed on another end of the cell stack body, an oxygen containing gas supply flow path configured to supply the oxygen containing gas to the fuel cell stack, and a compressor disposed in the oxygen containing gas supply flow path, wherein each of the two separator members includes a metal separator main body, the separator main body is integrally formed with a seal bead portion in order to prevent leakage of a fluid, which is the oxygen containing gas, the fuel gas, or a coolant, the seal bead portion protrudes from the separator main body in a stacking direction of the plurality of power generation cells, a rubber seal is interposed between a top part of the seal bead portion and the MEA member, and each of the plurality of power generation cells includes an oxygen containing gas supply passage through which the oxygen containing gas is supplied to electrical power generating regions of the plurality of power generation cells, wherein the first end plate includes an oxygen containing gas inlet configured to introduce the oxygen containing gas from the oxygen containing gas supply flow path into the oxygen containing gas supply passage, the second end plate includes a warm-up oxygen containing gas outlet configured to deliver out the oxygen containing gas to the exterior of the fuel cell stack from the oxygen containing gas supply passage, and the fuel cell stack further includes a lead out valve configured to switch between a first state in which leading out of the oxygen containing gas from the warm-up oxygen containing gas outlet to the exterior of the fuel cell stack is permitted, and a second state in which leading out of the oxygen containing gas from the warm-up oxygen containing gas outlet to the exterior of the fuel cell stack is blocked.

A third aspect of the present invention is characterized by a method of low temperature starting of a fuel cell system, the fuel cell system including a fuel cell stack including a cell stack body including a plurality of power generation cells stacked together each containing an MEA (membrane electrode assembly) member configured to generate electrical power due to an electrochemical reaction between an oxygen containing gas and a fuel gas, and two separator members arranged on both sides of the MEA member, a stack case in which the fuel cell stack is accommodated, an oxygen containing gas supply flow path configured to supply the oxygen containing gas to the fuel cell stack, and a compressor disposed in the oxygen containing gas supply flow path, wherein each of the two separator members includes a metal separator main body, the separator main body is integrally formed with a seal bead portion in order to prevent leakage of a fluid, which is the oxygen containing gas, the fuel gas, or a coolant, the seal bead portion protrudes from the separator main body in a stacking direction of the plurality of power generation cells, and a rubber seal is interposed between a top part of the seal bead portion and the MEA member, the method of low temperature starting of the fuel cell system including a warm-up step of warming up the fuel cell stack by introducing the oxygen containing gas, which is discharged from the compressor, into a case interior space between the stack case and the fuel cell stack in a state in which a temperature of the oxygen containing gas is raised by causing the oxygen containing gas to flow through a pressure loss member, and an electrical power generating step of, after having completed the warm-up step, initiating generation of electrical power, by supplying to the plurality of power generation cells the oxygen containing gas that is discharged from the compressor, together with supplying the fuel gas to the plurality of power generation cells.

A fourth aspect of the present invention is characterized by a method of low temperature starting of a fuel cell system, the fuel cell system including a fuel cell stack including a cell stack body in which there are stacked a plurality of power generation cells each containing an MEA (membrane electrode assembly) member configured to generate electrical power due to an electrochemical reaction between an oxygen containing gas and a fuel gas, and two separator members arranged on both sides of the MEA member, a first end plate disposed on one end of the cell stack body, and a second end plate disposed on another end of the cell stack body, an oxygen containing gas supply flow path configured to supply an oxygen containing gas to the fuel cell stack, and a compressor disposed in the oxygen containing gas supply flow path, wherein each of the two separator members includes a metal separator main body, the separator main body is integrally formed with a seal bead portion in order to prevent leakage of a fluid, which is the oxygen containing gas, the fuel gas, or a coolant, the seal bead portion protrudes from the separator main body in a stacking direction of the plurality of power generation cells, a rubber seal is interposed between a top part of the seal bead portion and the MEA member, and each of the plurality of power generation cells includes an oxygen containing gas supply passage through which the oxygen containing gas is supplied to electrical power generating regions of the plurality of power generation cells, wherein the first end plate includes an oxygen containing gas inlet configured to introduce the oxygen containing gas from the oxygen containing gas supply flow path into the oxygen containing gas supply passage, the second end plate includes a warm-up oxygen containing gas outlet configured to deliver out the oxygen containing gas to the exterior of the fuel cell stack from the oxygen containing gas supply passage, and the fuel cell stack further includes a lead out valve configured to switch between a first state in which leading out of the oxygen containing gas from the warm-up oxygen containing gas outlet to the exterior of the fuel cell stack is permitted, and a second state in which leading out of the oxygen containing gas from the warm-up oxygen containing gas outlet to the exterior of the fuel cell stack is blocked, the method of low temperature starting of the fuel cell system including a warm-up step of warming up the fuel cell stack by setting the lead out valve in the first state, and allowing the oxygen containing gas discharged from the compressor to flow through the oxygen containing gas supply passage, and an electrical power generating step of, after having completed the warm-up step, initiating generation of electrical power, by setting the lead out valve in the second state, and supplying the oxygen containing gas discharged from the compressor to the electrical power generating regions of the plurality of power generation cells, together with supplying the fuel gas to the electrical power generating regions of the plurality of power generation cells.

According to the first aspect of the present invention, when the power generation cells generate electrical power in a low temperature environment, by setting the switching unit in the second state and driving the compressor, the relatively high temperature oxygen containing gas discharged from the compressor can be introduced into the case interior space in a state in which the temperature of the oxygen containing gas is raised by the pressure loss member. Consequently, it is possible to efficiently raise the temperature of the rubber seal of the fuel cell stack. Further, by setting the switching unit to the first state in a state in which the rubber seal is sufficiently raised in temperature, because the oxygen containing gas discharged from the compressor is supplied to the interior of the fuel cell stack, the generation of electrical power by the power generation cells can be initiated. Accordingly, with a simple configuration, the temperature of the rubber seal can be efficiently raised. Consequently, when the power generation cells generate electrical power in a low temperature environment, leakage of the fuel gas from the rubber seal can be effectively suppressed.

According to the second aspect of the present invention, when the power generation cells generate electrical power in a low temperature environment, by placing the lead out valve in the first state and driving the compressor, the relatively high temperature oxygen containing gas discharged from the compressor can be made to flow through the oxygen containing gas supply passage. Consequently, it is possible to efficiently raise the temperature of the rubber seal of the fuel cell stack. Further, by setting the lead out valve to the second state in a state in which the rubber seal is sufficiently raised in temperature, the oxygen containing gas discharged from the compressor is supplied to the electrical power generating regions of each of the power generation cells. Therefore, the generation of electrical power by the power generation cells can be initiated. Accordingly, with a simple configuration, the temperature of the rubber seal can be efficiently raised. Consequently, when the power generation cells generate electrical power in a low temperature environment, leakage of the fuel gas from the rubber seal can be effectively suppressed.

According to the third aspect of the present invention, the warm-up step for warming up the fuel cell stack is performed in which the relatively high temperature oxygen containing gas discharged from the compressor is made to flow through the pressure loss member, and is introduced into the case interior space in a state in which the temperature of the oxygen containing gas is raised. Therefore, it is possible to efficiently raise the temperature of the rubber seal of the fuel cell stack in a low temperature environment. Further, after having completed the warm-up step, the electrical power generating step of initiating the generation of electrical power is performed by supplying to the power generation cells the oxygen containing gas discharged from the compressor, together with supplying the fuel gas to the power generation cells. Accordingly, with a simple configuration, the temperature of the rubber seal can be efficiently raised. Consequently, when the power generation cells generate electrical power in a low temperature environment, leakage of the fuel gas from the rubber seal can be effectively suppressed.

According to the fourth aspect of the present invention, the warm-up step for warming up the fuel cell stack is performed by setting the lead out valve in the first state, and thereby causing the relatively high temperature oxygen containing gas discharged from the compressor to flow through the oxygen containing gas supply passage. Therefore, it is possible to efficiently raise the temperature of the rubber seal of the fuel cell stack in a low temperature environment. Further, after having completed the warm-up step, the electrical power generating step of initiating the generation of electrical power is performed in which the lead out valve is set in the second state, and the oxygen containing gas discharged from the compressor is supplied to the electrical power generating regions of the power generation cells, together with supplying the fuel gas to the electrical power generating regions of the power generation cells. Accordingly, with a simple configuration, the temperature of the rubber seal can be efficiently raised, and as a result, when the power generation cells generate electrical power in a low temperature environment, leakage of the fuel gas from the rubber seal can be effectively suppressed.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 9 is a graph showing a relationship between the temperature of a rubber seal and an amount of fuel gas leakage;

DESCRIPTION OF THE INVENTION

First Embodiment

Figure 1:
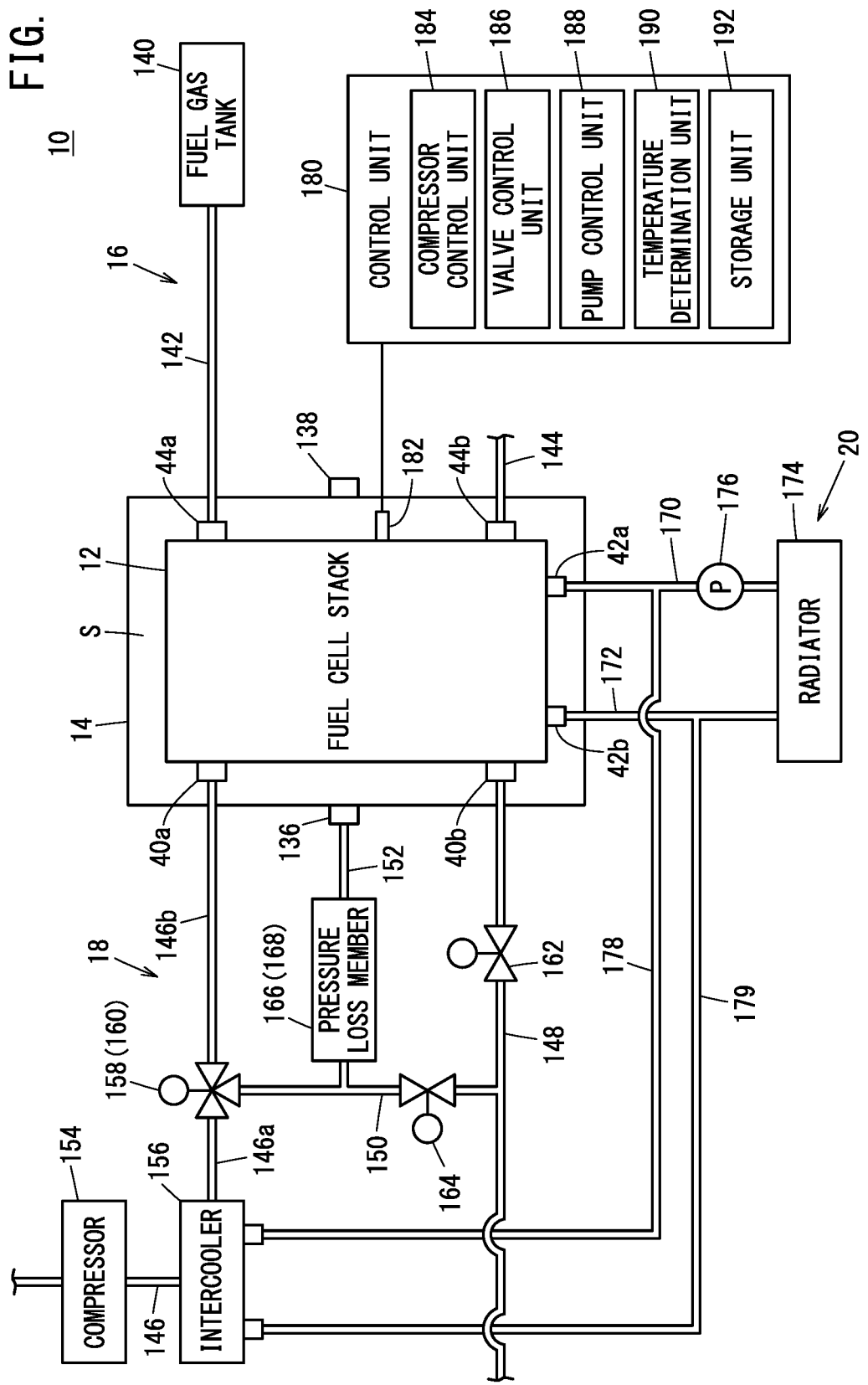
FIG. 1 is a schematic configuration diagram of a fuel cell system according to a first embodiment of the present invention.

As shown in FIG. 1, a fuel cell system 10 according to a first embodiment of the present invention is installed, for example, in a fuel cell vehicle (not shown) such as a fuel cell electric automobile. The fuel cell system 10 may also be a stationary type of fuel cell system.

As shown in FIG. 1, the fuel cell system 10 is equipped with a fuel cell stack 12, a stack case 14, an anode system device 16, a cathode system device 18, and a cooling device 20.

Figure 2:
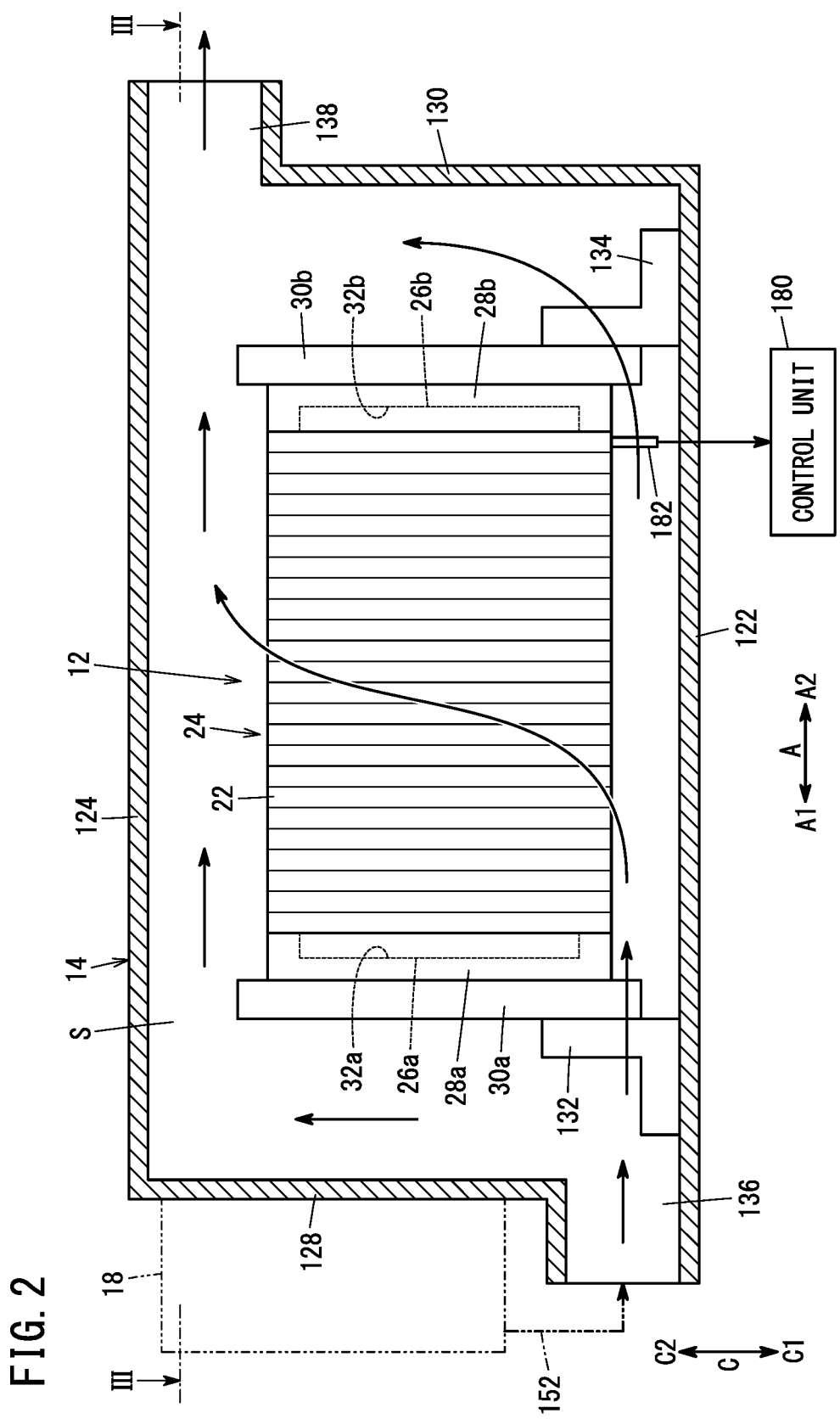
FIG. 2 is a cross-sectional explanatory diagram of a fuel cell stack and a stack case shown in FIG. 1.
Figure 3:
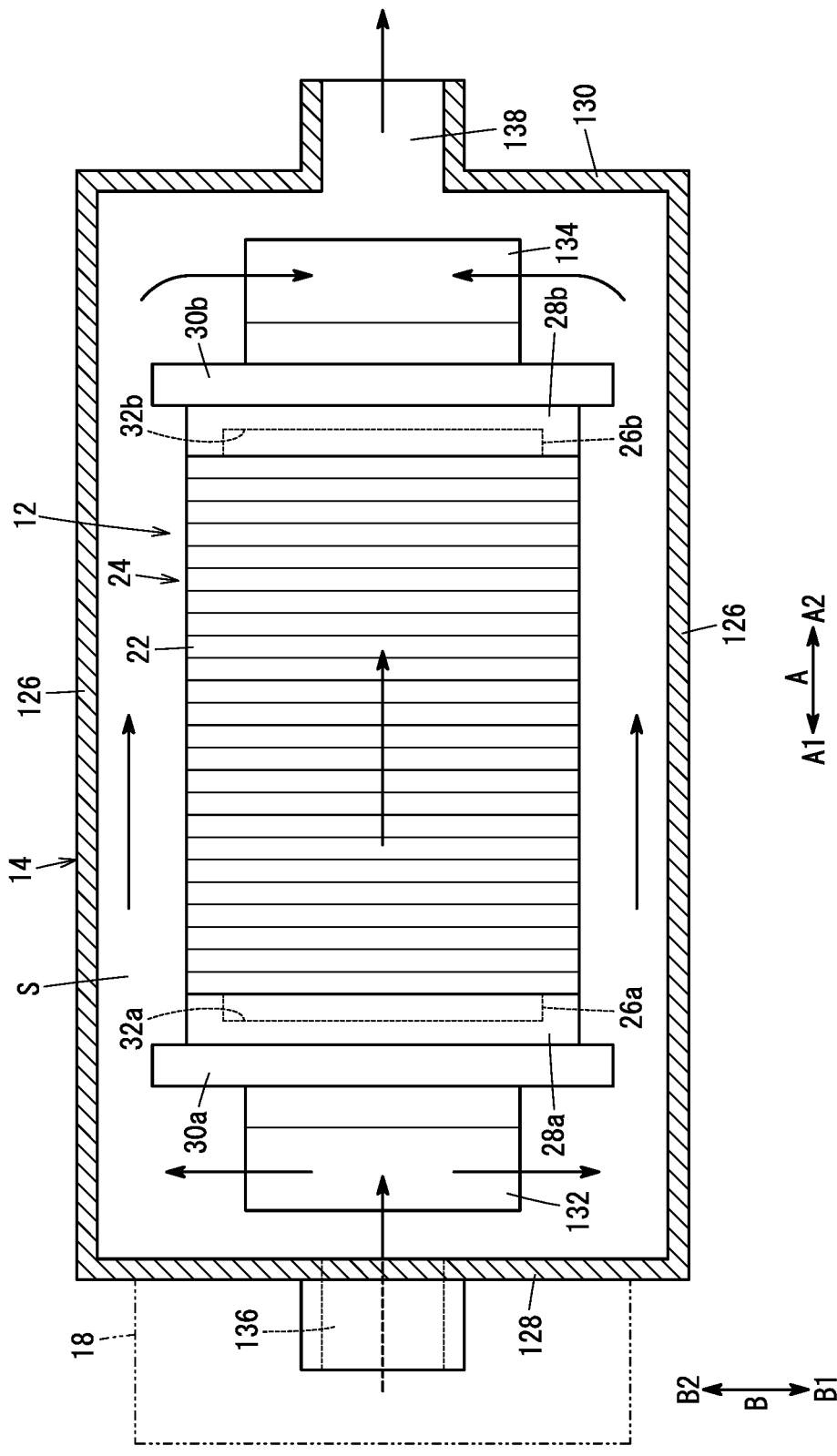
FIG. 3 is an explanatory cross-sectional view taken along line III-III of FIG. 2.
Figure 4:
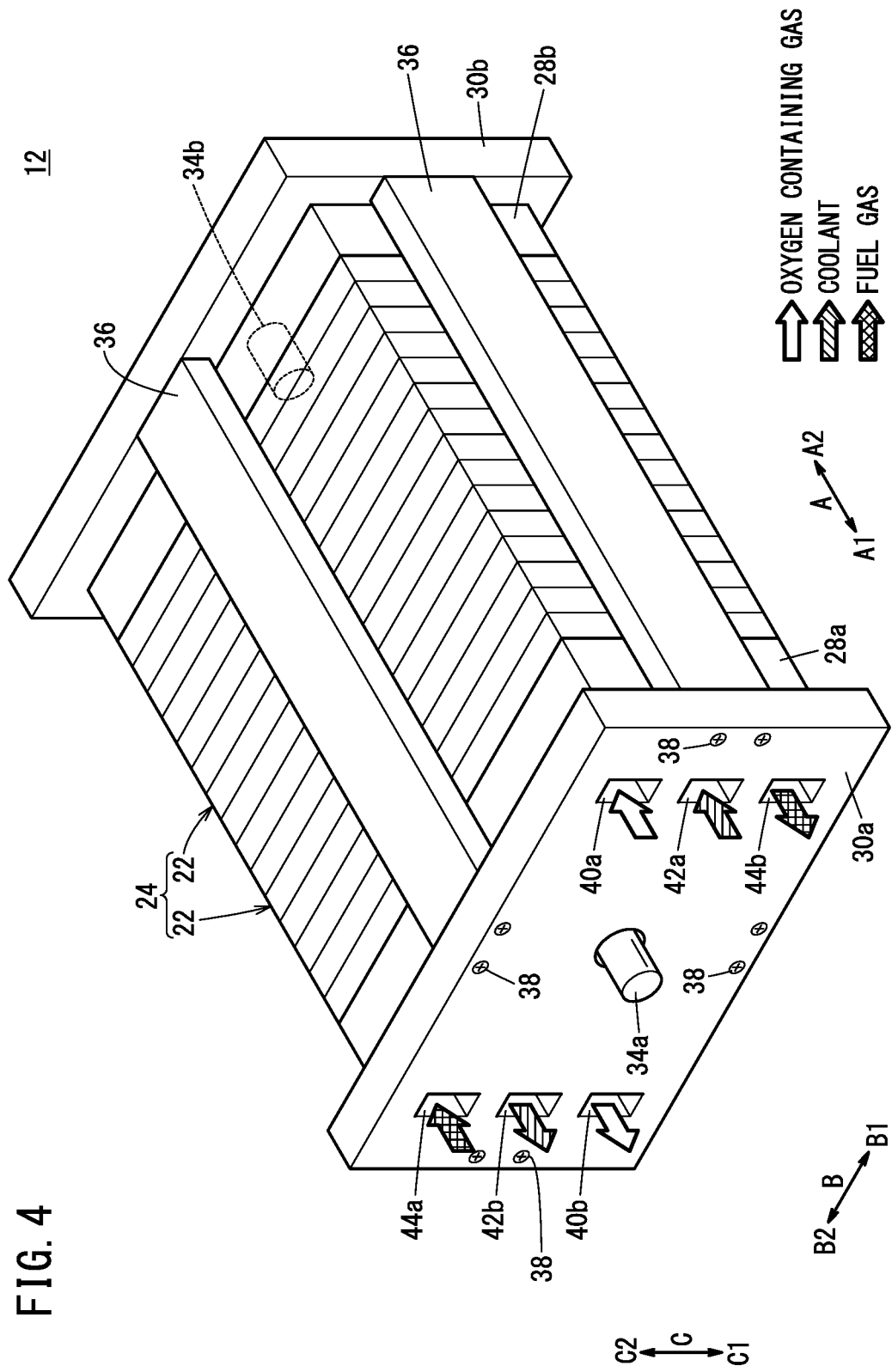
FIG. 4 is a perspective view of the fuel cell stack shown in FIG. 2.

As shown in FIGS. 2 to 4, the fuel cell stack 12 includes a cell stack body 24 in which a plurality of power generation cells 22 are stacked in the direction of the arrow A. The power generation cells 22 generate electrical power by electrochemical reactions that take place between an oxidizing gas (for example, an oxygen containing gas) and a fuel gas (for example, a hydrogen containing gas). In the following description, a stacking direction of the plurality of power generation cells 22 may simply be referred to as a "stacking direction".

At one end (an end in the direction of the arrow A1) in the stacking direction of the cell stack body 24, a first terminal member 26a, a first insulating plate 28a, and a first end plate 30a are arranged outwardly (in the direction of the arrow A1) sequentially in this order. At another end (an end in the direction of the arrow A2) in the stacking direction of the cell stack body 24, a second terminal member 26b, a second insulating plate 28b, and a second end plate 30b are arranged outwardly (in the direction of the arrow A2) sequentially in this order. The fuel cell stack 12 includes the first terminal member 26a, the first insulating plate 28a, the first end plate 30a, the second terminal member 26b, the second insulating plate 28b, and the second end plate 30b.

The first terminal member 26a and the second terminal member 26b collect the electrical power generated by each of the power generation cells 22. The first terminal member 26a and the second terminal member 26b are formed in a plate shape (a quadrangular-plate shape). The first terminal member 26a and the second terminal member 26b possess conductivity.

As shown in FIGS. 2 and 3, the first terminal member 26a is arranged in a first recessed portion 32a formed on an inner surface (a surface in the direction of the arrow A2) of the first insulating plate 28a. The first terminal member 26a is electrically connected to a first terminal portion 34a that protrudes from the first end plate 30a (refer to FIG. 4).

The second terminal member 26b is arranged in a second recessed portion 32b formed on an inner surface (a surface in the direction of the arrow A1) of the second insulating plate 28b. The second terminal member 26b is electrically connected to a second terminal portion 34b that protrudes from the second end plate 30b (refer to FIG. 4). The first insulating plate 28a and the second insulating plate 28b possess electrical insulation.

As shown in FIG. 4, the first end plate 30a and the second end plate 30b have a horizontally elongate rectangular shape. Connecting bars 36 are arranged between each of the sides of the first end plate 30a and the second end plate 30b. It should be noted that, in FIGS. 2 and 3, the connecting bars 36 are not shown for the sake of convenience.

One end part of the connecting bars 36 (an end in the direction of the arrow A1) is fastened by bolts 38 to an inner surface of the first end plate 30a. Another end part of the connecting bars 36 (an end in the direction of the arrow A2) is fastened by non-illustrated bolts to an inner surface of the second end plate 30b. The connecting bars 36 apply a compressive load in the stacking direction to the cell stack body 24.

As shown in FIG. 4, one end edge portions in the direction of the longitudinal sides of the first end plate 30a and the first insulating plate 28a include an oxygen containing gas inlet 40a, a coolant inlet 42a, and a fuel gas outlet 44b. The one end edge portions in the direction of the longitudinal sides of the first end plate 30a and the first insulating plate 28a are end edge portions in the direction of the arrow B1 of the first end plate 30a and the first insulating plate 28a. The oxygen containing gas inlet 40a, the coolant inlet 42a, and the fuel gas outlet 44b are disposed by being arranged alongside one another in the direction of a lateral side of the first end plate 30a. The direction of the lateral side of the first end plate 30a lies along the direction of the arrow C.

The oxygen containing gas inlet 40a introduces the oxygen containing gas into the fuel cell stack 12. The coolant inlet 42a introduces a coolant (for example, pure water, ethylene glycol, oil, or the like) into the fuel cell stack 12. The fuel gas outlet 44b delivers out the fuel exhaust gas (including non-reacted fuel gas), which is the fuel gas consumed during the generation of electrical power, from the fuel cell stack 12.

Other end edge portions in the direction of the longitudinal sides of the first end plate 30a and the first insulating plate 28a include a fuel gas inlet 44a, a coolant outlet 42b, and an oxygen containing gas outlet 40b. The other end edge portions in the direction of the longitudinal sides of the first end plate 30a and the first insulating plate 28a are end edge portions in the direction of the arrow B2 of the first end plate 30a and the first insulating plate 28a. The fuel gas inlet 44a, the coolant outlet 42b, and the oxygen containing gas outlet 40b are arranged alongside one another in the direction of the arrow C.

The fuel gas inlet 44a introduces the fuel gas into the fuel cell stack 12. The coolant outlet 42b delivers the coolant out from the fuel cell stack 12. The oxygen containing gas outlet 40b delivers out an oxygen containing exhaust gas (including non-reacted oxygen containing gas), which is the oxygen containing gas consumed during the generation of electrical power, from the fuel cell stack 12.

Figure 5:
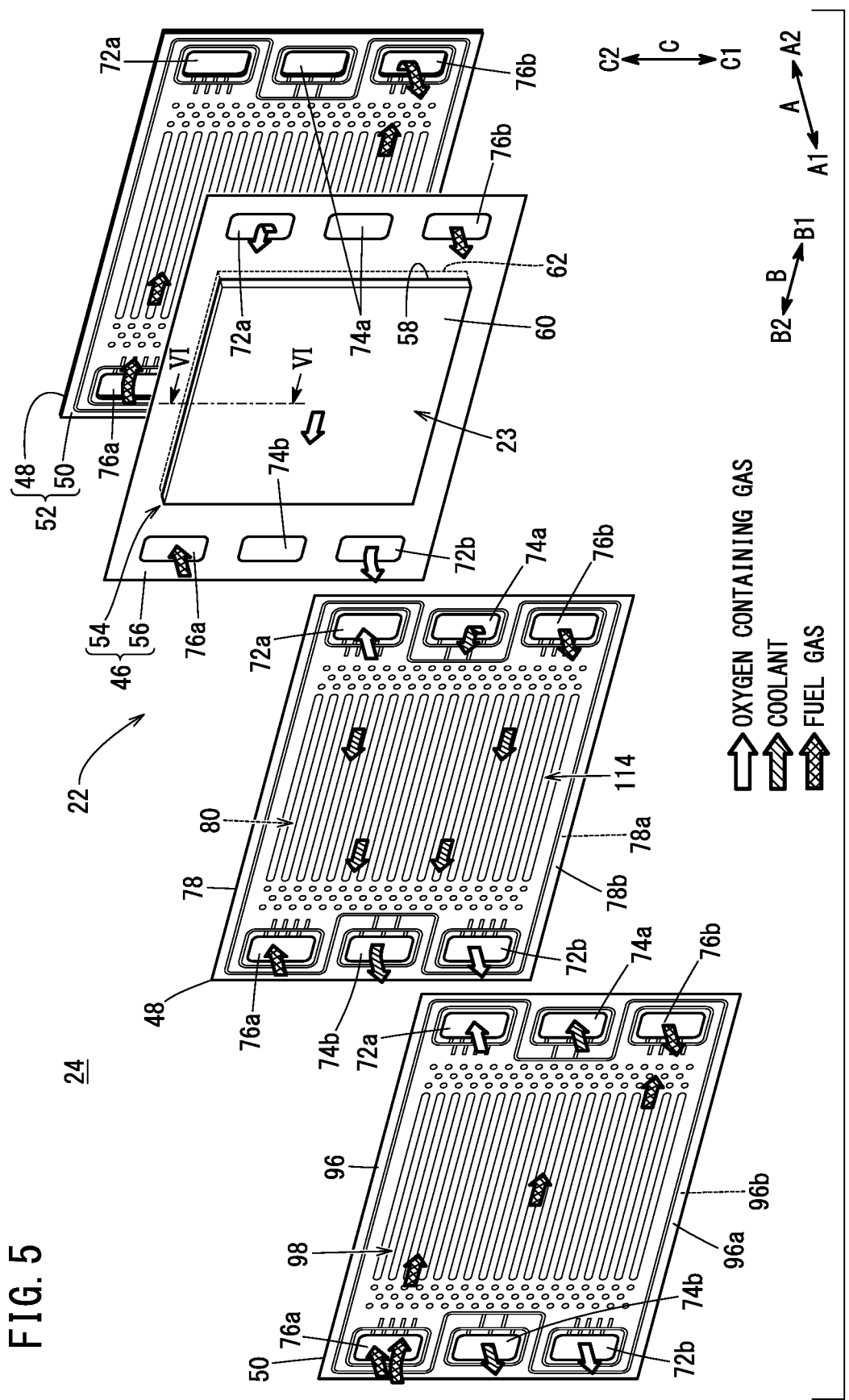
FIG. 5 is an exploded perspective view with partial omission of the cell stack shown in FIG. 4.

As shown in FIG. 5, each of the power generation cells 22 has a horizontally elongate rectangular shape. Each of the power generation cells 22 includes an MEA member 46 (a resin frame equipped MEA), a first separator member 48, and a second separator member 50. The MEA member 46 is arranged between the first separator member 48 and the second separator member 50. The first separator member 48 and the second separator member 50 are joined to each other by a plurality of non-illustrated joining lines, and thereby form a joint separator 52.

The MEA member 46 generates electrical power by electrochemical reactions that take place between the oxygen containing gas and the fuel gas. The MEA member 46 comprises an MEA 54 (membrane electrode assembly) and a resin frame member 56. The resin frame member 56 projects outward from an outer peripheral portion of the MEA 54. The resin frame member 56 is attached to the outer peripheral portion of the MEA member 46.

Figure 6:
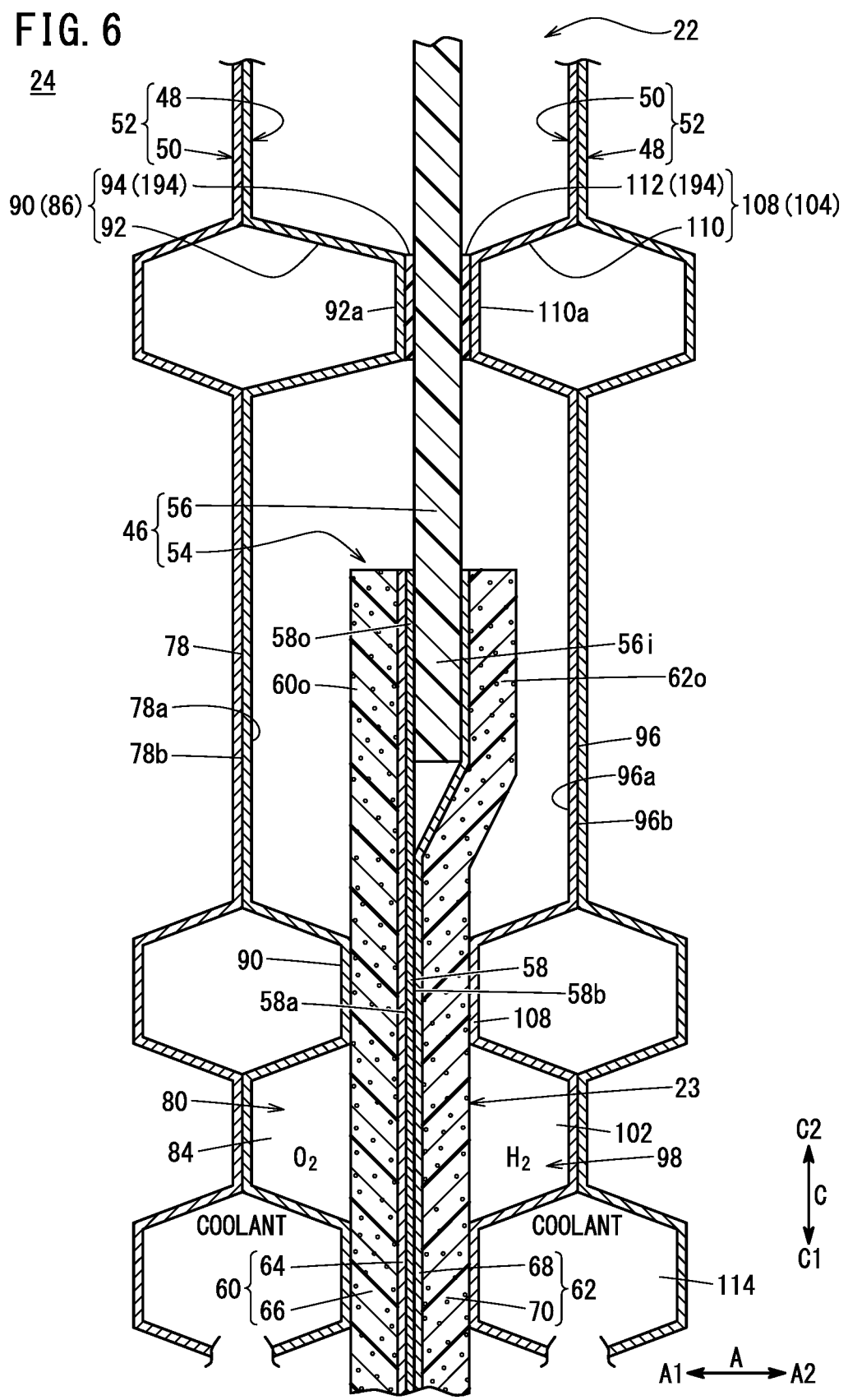
FIG. 6 is a cross-sectional view with partial omission taken along line VI-VI of FIG. 5.

As shown in FIG. 6, the MEA 54 includes an electrolyte membrane 58, a first electrode 60, and a second electrode 62. The first electrode 60 is arranged on one surface 58a of the electrolyte membrane 58. The second electrode 62 is arranged on another surface 58b of the electrolyte membrane 58. The electrolyte membrane 58, for example, is a solid polymer electrolyte membrane (cation ion exchange membrane). The solid polymer electrolyte membrane is formed by impregnating a thin membrane of perfluorosulfonic acid with water, for example. The electrolyte membrane 58 is sandwiched and gripped between the first electrode 60 and the second electrode 62. The electrolyte membrane 58 may be a fluorine based electrolyte or an HC (hydrocarbon) based electrolyte.

The first electrode 60 includes a first electrode catalyst layer 64 and a first gas diffusion layer 66. The first electrode catalyst layer 64 is joined to the one surface 58a of the electrolyte membrane 58. The first gas diffusion layer 66 is laminated on the first electrode catalyst layer 64. The second electrode 62 includes a second electrode catalyst layer 68 and a second gas diffusion layer 70. The second electrode catalyst layer 68 is joined to the other surface 58b of the electrolyte membrane 58. The second gas diffusion layer 70 is laminated on the second electrode catalyst layer 68.

The first electrode catalyst layer 64 contains, for example, porous carbon particles on which a platinum alloy is supported on the surface thereof. The porous carbon particles are uniformly coated on the surface of the first gas diffusion layer 66 together with an ion conductive polymer binder. The second electrode catalyst layer 68 contains, for example, porous carbon particles on which a platinum alloy is supported on the surface thereof. The porous carbon particles are uniformly coated on the surface of the second gas diffusion layer 70 together with an ion conductive polymer binder. The first gas diffusion layer 66 and the second gas diffusion layer 70 include carbon paper, carbon cloth, or the like.

The resin frame member 56 possesses an electrical insulating property. As examples of the constituent material of the resin frame member 56, there may be cited PPS (polyphenylene sulfide), PPA (polyphthalamide), PEN (polyethylene naphtalate), PES (polyethersulfone), LCP (liquid crystal polymer), PVDF (polyvinylidene fluoride), silicone resin, fluorosilicone resin, m-PPE (modified polyphenylene ether resin), PET (polyethylene terephthalate), PBT (polybutylene terephthalate), or modified polyolefin and the like.

The resin frame member 56 is formed in a quadrangular annular shape (refer to FIG. 5). An inner peripheral portion 56i of the resin frame member 56 is arranged between an outer peripheral portion 60o of the first electrode 60 and an outer peripheral portion 62o of the second electrode 62. More specifically, the inner peripheral portion 56i of the resin frame member 56 is sandwiched between an outer peripheral portion 58o of the electrolyte membrane 58 and the outer peripheral portion 62o of the second electrode 62. Moreover, the inner peripheral portion 56i of the resin frame member 56 is sandwiched between the outer peripheral portion 58o of the electrolyte membrane 58 and the outer peripheral portion 60o of the first electrode 60.

As shown in FIG. 5, one end edge portion in the direction of the longitudinal sides of each of the power generation cells 22 includes an oxygen containing gas supply passage 72a, a coolant supply passage 74a, and a fuel gas discharge passage 76b. The one end edge portion in the direction of the longitudinal sides of each of the power generation cells 22 is an end edge portion in the direction of the arrow B1 of each of the power generation cells 22. The oxygen containing gas supply passage 72a, the coolant supply passage 74a, and the fuel gas discharge passage 76b are disposed by being arranged alongside one another in the direction of the lateral sides of each of the power generation cells 22. The direction of the lateral sides of each of the power generation cells 22 lies along the direction of the arrow C.

As shown in FIGS. 4 and 5, the oxygen containing gas introduced from the oxygen containing gas inlet 40a flows in the direction of the arrow A2 through the oxygen containing gas supply passage 72a. The oxygen containing gas that flows through the oxygen containing gas supply passage 72a is supplied to electrical power generating regions 23 of each of the power generation cells 22. The coolant introduced from the coolant inlet 42a flows in the direction of the arrow A2 through the coolant supply passage 74a. The fuel exhaust gas flows in the direction of the arrow A1 through the fuel gas discharge passage 76b. The fuel exhaust gas that has flowed through the fuel gas discharge passage 76b is delivered out from the fuel gas outlet 44b.

As shown in FIG. 5, another end edge portion in the direction of the longitudinal sides of each of the power generation cells 22 includes a fuel gas supply passage 76a, a coolant discharge passage 74b, and an oxygen containing gas discharge passage 72b. The other end edge portion in the longitudinal direction of each of the power generation cells 22 is an end edge portion in the direction of the arrow B2 of each of the power generation cells 22. The fuel gas supply passage 76a, the coolant discharge passage 74b, and the oxygen containing gas discharge passage 72b are disposed by being arranged alongside one another in the direction of the arrow C.

As shown in FIGS. 4 and 5, the fuel gas introduced from the fuel gas inlet 44a flows in the direction of the arrow A2 through the fuel gas supply passage 76a. The fuel gas that flows through the fuel gas supply passage 76a is supplied to the electrical power generating regions 23 of each of the power generation cells 22. The coolant flows in the direction of the arrow A1 through the coolant discharge passage 74b. The coolant that has flowed through the coolant discharge passage 74b is delivered out from the coolant outlet 42b. The oxygen containing exhaust gas flows in the direction of the arrow A1 through the oxygen containing gas discharge passage 72b. The oxygen containing exhaust gas that has flowed through the oxygen containing gas discharge passage 72b is delivered out from the oxygen containing gas outlet 40b.

The number, the arrangement, the shape, and the size of the aforementioned passages (the oxygen containing gas supply passage 72a and the like) are not limited to those of the present embodiment, and may be appropriately set in accordance with required specifications. The same considerations apply to the aforementioned oxygen containing gas inlet 40a, the oxygen containing gas outlet 40b, the fuel gas inlet 44a, the fuel gas outlet 44b, the coolant inlet 42a, and the coolant outlet 42b.

Figure 7:
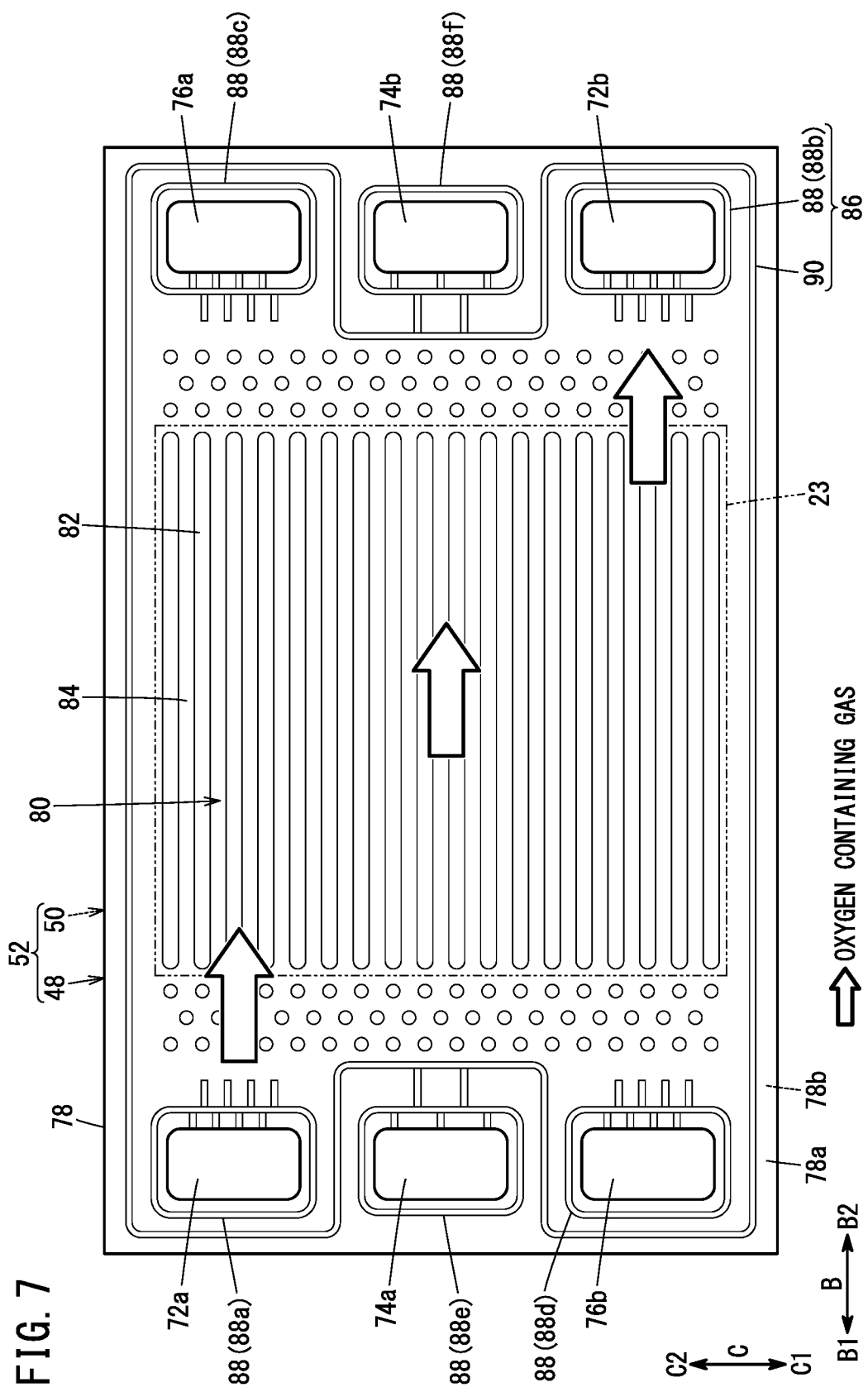
FIG. 7 is a plan view of a joint separator as viewed in a direction from a first separator member toward a second separator member.

As shown in FIG. 7, the first separator member 48 includes a rectangular shaped first separator main body 78. The first separator main body 78 is formed by press forming a thin metal plate so as to have a cross section of a corrugated shape. The thin metal plate, for example, is a steel plate, a stainless steel plate, an aluminum plate, or a plated steel plate. The thin metal plate may be a stainless steel plate on which an anti-corrosive surface treatment has been performed, or an aluminum plate on which an anti-corrosive surface treatment has been performed.

A surface of the first separator main body 78 facing toward the MEA member 46 (hereinafter referred to as a "surface 78a") has an oxygen containing gas flow field 80 (reactant gas flow field) that extends in the direction of the longitudinal side (the direction of the arrow B) of each of the power generation cells 22. The oxygen-containing gas flow field 80 communicates fluidically with the oxygen containing gas supply passage 72a and the oxygen containing gas discharge passage 72b. The oxygen containing gas flow field 80 supplies the oxygen containing gas to the first electrode 60.

The oxygen containing gas flow field 80 includes a plurality of first flow field grooves 84. Each of the first flow field grooves 84 is positioned between a plurality of first flow field protrusions 82 that extend in the direction of the arrow B. Stated otherwise, in the oxygen containing gas flow field 80, the first flow field protrusions 82, and the first flow field grooves 84 are alternately arranged in a widthwise direction (the direction of the arrow C) of the flow field. The plurality of first flow field protrusions 82 and the plurality of first flow field grooves 84 are integrally formed in the first separator main body 78 by press forming. The first flow field protrusions 82 and the first flow field grooves 84 extend in a straight line shape in the direction of the arrow B. However, the first flow field protrusions 82 and the first flow field grooves 84 may extend in a wavy shape in the direction of the arrow B.

A first seal member 86 for preventing leakage of a fluid which is the reactant gas (the oxygen containing gas or the fuel gas) or the coolant is provided on a surface 78a of the first separator main body 78. The first seal member 86 extends in a straight line shape when viewed from the separator thickness direction (in the direction of the arrow A). However, the first seal member 86 may extend in a wavy shape when viewed from the separator thickness direction (in the stacking direction).

The first seal member 86 includes a plurality of first passage sealing portions 88, and a first flow field sealing portion 90. The plurality of first passage sealing portions 88 individually surround the plurality of passages (the oxygen containing gas supply passage 72a, etc.). The first flow field sealing portion 90 is positioned on an outer peripheral portion of the first separator main body 78.

Hereinafter, among the plurality of first passage sealing portions 88, the sealing portion surrounding the oxygen containing gas supply passage 72a is referred to as a "first passage sealing portion 88a", and the sealing portion surrounding the oxygen containing gas discharge passage 72b is referred to as a "first passage sealing portion 88b". Further, among the plurality of first passage sealing portions 88, the sealing portion surrounding the fuel gas supply passage 76a is referred to as a "first passage sealing portion 88c", and the sealing portion surrounding the fuel gas discharge passage 76b is referred to as "a first passage sealing portion 88d". Furthermore, among the plurality of first passage sealing portions 88, the sealing portion surrounding the coolant supply passage 74a is referred to as a "first passage sealing portion 88e", and the sealing portion surrounding the coolant discharge passage 74b is referred to as a "first passage sealing portion 88f".

The first flow field sealing portion 90 prevents leakage of a reactant gas (the oxygen containing gas). The first flow field sealing portion 90 surrounds the oxygen containing gas flow field 80 and the plurality of first passage sealing portions 88a to 88d. The first passage sealing portions 88e and 88f are positioned on an outer side of the first flow field sealing portion 90.

As shown in FIG. 6, the first seal member 86 includes a first seal bead portion 92 and a first rubber seal 94 (micro seal). The first seal bead portion 92 is integrally formed, by press forming, with the first separator main body 78 so as to project toward the MEA member 46. The first rubber seal 94 is attached to a top part 92a of the first seal bead portion 92. A cross-sectional shape of the first seal bead portion 92 is trapezoidal. Stated otherwise, the cross-sectional shape of the first seal bead portion 92 is tapered toward a protruding direction of the first seal bead portion 92. More specifically, the first seal bead portion 92 is capable of being elastically deformed by a compressive load in the direction of the arrow A. Moreover, the cross-sectional shape of the first seal bead portion 92 may also be rectangular or square shaped.

The first rubber seal 94 is an elastic member that is fixed to the top part 92a (a protruding end surface) of the first seal bead portion 92. The first rubber seal 94 is constituted, for example, from a foamed fluororubber (fluororubber foamed body). Because such a foamed fluororubber is excellent in terms of the sealing properties (gas permeability), heat resistance, and chemical resistance thereof, it is suitable as the constituent material of the first rubber seal 94.

Further, such a first rubber seal 94 can be formed by fixing a foamed fluororubber sheet to the top part 92a of the first seal bead portion 92. In this case, since it is not necessary to apply a rubber material to the top part 92a of the first seal bead portion 92 using a dispenser or a coater, manufacturing costs can be reduced.

The constituent material of the first rubber seal 94 is not limited to the aforementioned material, and may be the above-described rubber and a material such as EPDM (ethylene-propylene rubber), NBR, silicone rubber, fluorosilicone rubber, butyl rubber, natural rubber, styrene rubber, chloroprene or acrylic rubber, or the like, or alternatively a porous body (foamed body) thereof.

A thickness of the first rubber seal 94, for example, is greater than or equal to 30 μm and less than or equal to 200 μm. However, the thickness of the first rubber seal 94 can be set appropriately. The first rubber seal 94 is interposed between the top part 92a of the first seal bead portion 92 and the resin frame member 56. The first rubber seal 94 may be fixed to the resin frame member 56 without being fixed to the first seal bead portion 92.

Figure 8:
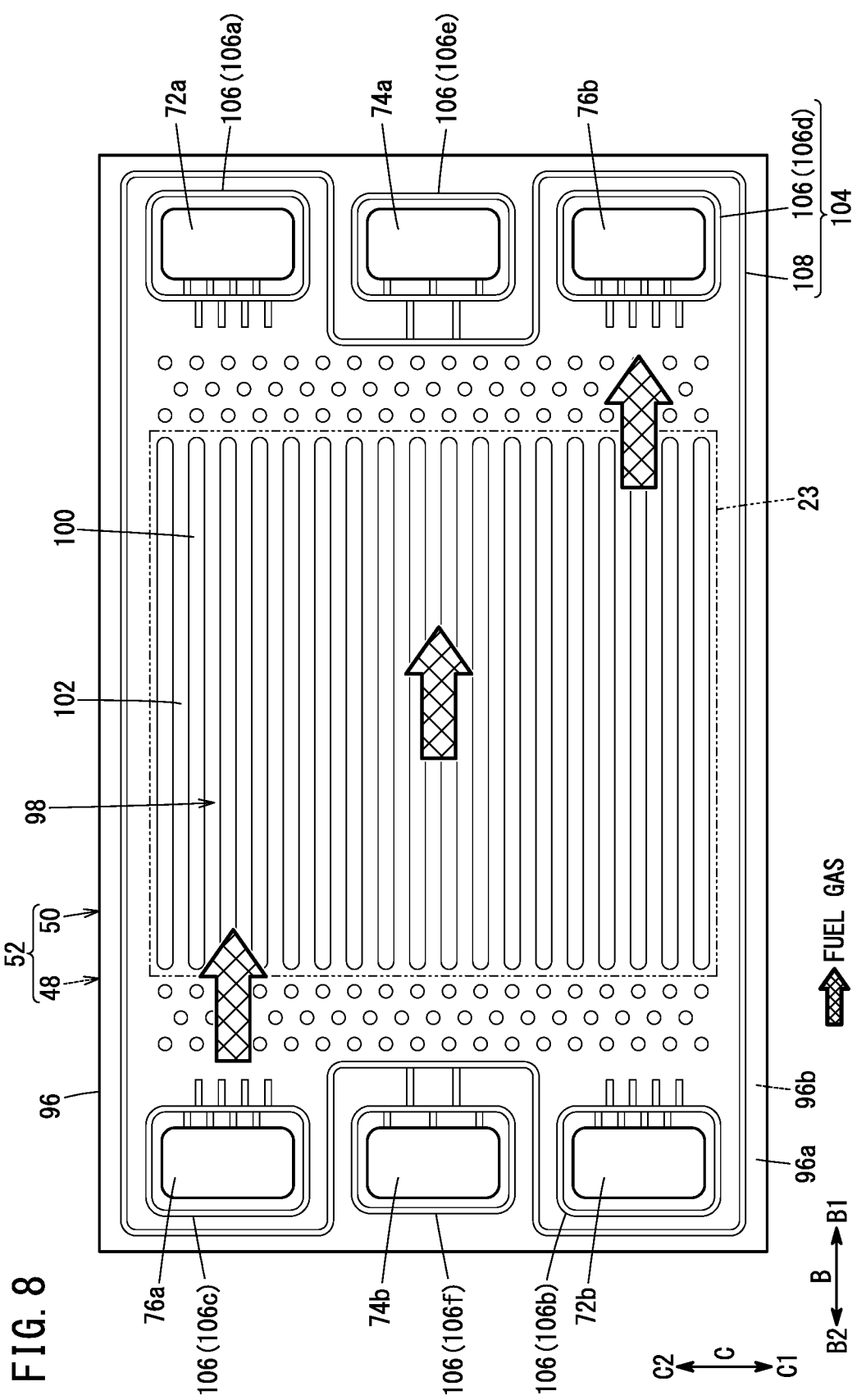
FIG. 8 is a plan view of a joint separator as viewed in a direction from the second separator member toward the first separator member.

As shown in FIG. 8, the second separator member 50 includes a rectangular shaped second separator main body 96. The second separator main body 96 is formed by press forming a thin metal plate so as to have a cross section of a corrugated shape. The thin metal plate, for example, is a steel plate, a stainless steel plate, an aluminum plate, or a plated steel plate. The thin metal plate may be a stainless steel plate on which an anti-corrosive surface treatment has been performed, or an aluminum plate on which an anti-corrosive surface treatment has been performed.

A surface of the second separator main body 96 facing toward the MEA member 46 (hereinafter referred to as a "surface 96a") is a fuel gas flow field 98 (reactant gas flow field) that extends in the direction of the longitudinal side (the direction of the arrow B) of each of the power generation cells 22. The fuel gas flow field 98 communicates fluidically with the fuel gas supply passage 76a and the fuel gas discharge passage 76b. The fuel gas flow field 98 supplies the fuel gas to the second electrode 62.

The fuel gas flow field 98 includes a plurality of second flow field grooves 102. Each of the second flow field grooves 102 is positioned between a plurality of second flow field protrusions 100 that extend in the direction of the arrow B. Stated otherwise, in the fuel gas flow field 98, the second flow field protrusions 100, and the second flow field grooves 102 are alternately arranged in a widthwise direction (the direction of the arrow C) of the flow field. The plurality of second flow field protrusions 100 and the plurality of second flow field grooves 102 are integrally formed in the second separator main body 96 by press forming. The second flow field protrusions 100 and the second flow field grooves 102 extend in a straight line shape in the direction of the arrow B. However, the second flow field protrusions 100 and the second flow field grooves 102 may extend in a wavy shape in the direction of the arrow B.

A second seal member 104 for preventing leakage of a fluid, which is the reactant gas (the oxygen containing gas or the fuel gas) or the coolant, is provided on a surface 96a of the second separator main body 96. The second seal member 104 extends in a straight line shape when viewed from the separator thickness direction (in the direction of the arrow A). However, the second seal member 104 may extend in a wavy shape when viewed from the separator thickness direction (in the stacking direction). The second seal member 104 overlaps with the first seal member 86 when viewed from the separator thickness direction (the stacking direction) (refer to FIG. 6).

The second seal member 104 includes a plurality of second passage sealing portions 106, and a second flow field sealing portion 108. The plurality of second passage sealing portions 106 individually surround the plurality of passages (the oxygen containing gas supply passage 72a, etc.). The second flow field sealing portion 108 is positioned on an outer peripheral portion of the first separator main body 78.

Hereinafter, among the plurality of second passage sealing portions 106, the sealing portion surrounding the oxygen containing gas supply passage 72a is referred to as a "second passage sealing portion 106a", and the sealing portion surrounding the oxygen containing gas discharge passage 72b is referred to as a "second passage sealing portion 106b". Further, among the plurality of second passage sealing portions 106, the sealing portion surrounding the fuel gas supply passage 76a is referred to as a "second passage sealing portion 106c", and the sealing portion surrounding the fuel gas discharge passage 76b is referred to as a "second passage sealing portion 106d". Furthermore, among the plurality of second passage sealing portions 106, the sealing portion surrounding the coolant supply passage 74a is referred to as a "second passage sealing portion 106e''', and the sealing portion surrounding the coolant discharge passage 74b is referred to as a "second passage sealing portion 106f'".

The second flow field sealing portion 108 prevents leakage of a reactant gas (the fuel gas). The second flow field sealing portion 108 surrounds the fuel gas flow field 98 and the plurality of second passage sealing portions 106a to 106d. The second passage sealing portions 106e and 106f are positioned on an outer side of the second flow field sealing portion 108.

As shown in FIG. 6, the second seal member 104 includes a second seal bead portion 110 and a second rubber seal 112 (micro seal). The second seal bead portion 110 is integrally formed, by press forming, with the second separator main body 96 so as to project toward the MEA member 46. A second rubber seal 112 is attached to a top part 110a of the second seal bead portion 110. A cross-sectional shape of the second seal bead portion 110 is trapezoidal. Stated otherwise, the cross-sectional shape of the second seal bead portion 110 is tapered toward a protruding direction of the second seal bead portion 110. More specifically, the second seal bead portion 110 is capable of being elastically deformed by a compressive load in the direction of the arrow A. Moreover, the cross-sectional shape of the second seal bead portion 110 may also be rectangular or square shaped.

The second rubber seal 112 is an elastic member that is fixed to the top part 110a (a protruding end surface) of the second seal bead portion 110. The second rubber seal 112 is constituted by the same constituent material as the aforementioned first rubber seal 94.

The second rubber seal 112 is interposed between the top part 110a of the second seal bead portion 110 and the resin frame member 56. The second rubber seal 112 may be fixed to the resin frame member 56 without being fixed to the second seal bead portion 110.

As shown in FIG. 5, a coolant flow field 114 is positioned between a surface 78b of the first separator main body 78 and a surface 96b of the second separator main body 96. The coolant flow field 114 communicates fluidically with the coolant supply passage 74a and the coolant discharge passage 74b. The coolant flow field 114 is formed by overlapping and matching together the rear surface shape of the first separator main body 78 and the rear surface shape of the second separator main body 96.

As shown in FIGS. 2 and 3, the stack case 14 accommodates the fuel cell stack 12. The stack case 14 includes a lower wall portion 122, an upper wall portion 124, and a pair of side wall portions 126. The lower wall portion 122 covers the fuel cell stack 12 from below (in the direction of the arrow C1). The upper wall portion 124 covers the fuel cell stack 12 from above (in the direction of the arrow C2). The pair of side wall portions 126 cover the fuel cell stack 12 from the sides (in the direction of the arrow B). Further, the stack case 14 includes a first end wall portion 128 and a second end wall portion 130. The first end wall portion 128 covers the fuel cell stack 12 from the direction of the arrow A1. The second end wall portion 130 covers the fuel cell stack 12 from the direction of the arrow A2.

A first mount member 132, which is fixed to the first end plate 30a, is fixed by non-illustrated bolts or the like to a part of the lower wall portion 122 between the center and the first end wall portion 128 in the direction of the arrow A. A second mount member 134, which is fixed to the second end plate 30b, is fixed by non-illustrated bolts or the like to a part of the lower wall portion 122 between the center and the second end wall portion 130 in the direction of the arrow A.

An introduction port 136 for introducing the oxygen containing gas for warming into the case interior space S between the stack case 14 and the fuel cell stack 12 is positioned at the lower part of the first end wall portion 128 (refer to FIG. 2). The introduction port 136 is positioned substantially in the center (of the first end wall portion 128) of the stack case 14 in the widthwise direction (the direction of the arrow B) (refer to FIG. 3).

A lead out port 138 for leading out the gas (the oxygen containing gas for warming) from the case interior space S to the exterior of the stack case 14 is positioned at the upper part of the second end wall portion 130 (refer to FIG. 2). The lead out port 138 is positioned substantially in the center (of the second end wall portion 130) of the stack case 14 in the widthwise direction (the direction of the arrow B) (refer to FIG. 3). The lead out port 138 is positioned above the introduction port 136 (in the direction of the arrow C2).

As shown in FIG. 1, the anode system device 16 includes a fuel gas tank 140, a fuel gas supply flow path 142, and a fuel gas discharge flow path 144. The fuel gas tank 140 stores a high pressure fuel gas (e.g., high pressure hydrogen). The fuel gas supply flow path 142 supplies the fuel gas in the fuel gas tank 140 to the fuel gas inlet 44a of the fuel cell stack 12. The fuel gas exhaust gas that is delivered out from the fuel gas outlet 44b of the fuel cell stack 12 is guided to the fuel gas discharge flow path 144. Although detailed illustration thereof is omitted, the anode system device 16 includes anode system auxiliary equipment (accessories). The anode system auxiliary equipment includes injectors, valves, a gas/liquid separator, and the like.

The cathode system device 18 includes an oxygen containing gas supply flow path 146, an oxygen containing gas discharge flow path 148, a bypass flow path 150, and a warm-up introduction passage 152. The oxygen containing gas supply flow path 146 supplies the oxygen containing gas (air) into the oxygen containing gas inlet 40a of the fuel cell stack 12. The oxygen containing exhaust gas that is delivered out from the oxygen containing gas outlet 40b of the fuel cell stack 12 is guided to the oxygen containing gas discharge flow path 148. The bypass flow path 150 connects the oxygen containing gas supply flow path 146 and the oxygen containing gas discharge flow path 148 to each other. The warm-up introduction passage 152 supplies to the introduction port 136 the oxygen containing gas which has been guided from the oxygen containing gas supply flow path 146 to the bypass flow path 150.

A compressor 154, an intercooler 156, and a switching valve 158 (switching unit) are attached to the oxygen containing gas supply flow path 146. The compressor 154 compresses the oxygen containing gas (air) that has been introduced from a non-illustrated air cleaner. The temperature of the oxygen containing gas discharged from the compressor 154 is higher than the temperature of the oxygen containing gas drawn in by the compressor 154.

When electrical power is generated, the intercooler 156 cools the oxygen containing gas discharged from the compressor 154. The intercooler 156 is a water cooled type of intercooler. In this case, the coolant that is guided from the cooling device 20 flows through the intercooler 156. More specifically, the intercooler 156 cools the oxygen containing gas by carrying out heat exchange between the oxygen containing gas discharged from the compressor 154 and the coolant flowing through the intercooler 156.

The switching valve 158 is provided at a connected portion between the oxygen containing gas supply flow path 146 and the bypass flow path 150. The switching valve 158 is a three-way valve 160. The switching valve 158 is connected to an upstream side flow path 146a, a downstream side flow path 146b, and the bypass flow path 150. The upstream side flow path 146a refers to a portion in the oxygen containing gas supply flow path 146 on a more upstream side than the connected portion with the bypass flow path 150. The downstream side flow path 146b refers to a portion in the oxygen containing gas supply flow path 146 on a more downstream side than the connected portion with the bypass flow path 150.

The switching valve 158 is formed so as to be capable of switching between a first state and a second state. In the first state, the switching valve 158 places the upstream side flow path 146a and the downstream side flow path 146b in communication with each other, and blocks communication between the bypass flow path 150 and the upstream side flow path 146a, together with blocking communication between the bypass flow path 150 and the downstream side flow path 146b. In the second state, the switching valve 158 places the upstream side flow path 146a and the bypass flow path 150 in communication with each other, and blocks communication between the downstream side flow path 146b and the upstream side flow path 146a, together with blocking communication between the downstream side flow path 146b and the bypass flow path 150.

Stated otherwise, in the first state, the switching valve 158 permits the oxygen containing gas from the oxygen containing gas supply flow path 146 to be supplied to the fuel cell stack 12, together with blocking introduction of the oxygen containing gas from the oxygen containing gas supply flow path 146 into the case interior space S via the warm-up introduction passage 152. In the second state, the switching valve 158 blocks supply of the oxygen containing gas from the oxygen containing gas supply flow path 146 into the fuel cell stack 12, together with permitting introduction of the oxygen containing gas from the oxygen containing gas supply flow path 146 into the case interior space S via the warm-up introduction passage 152.

A back pressure valve 162 is installed in the oxygen containing gas discharge flow path 148. The pressure in the oxygen containing gas flow field 80 of the fuel cell stack 12 can be adjusted by adjusting a degree of opening of the back pressure valve 162. Further, in a valve-closed state, the back pressure valve 162 closes the oxygen containing gas discharge flow path 148.

A bypass valve 164 is installed in the bypass flow path 150. The bypass valve 164 is capable of switching between a valve-open state in which the bypass flow path 150 is opened, and a valve-closed state in which the bypass flow path 150 is closed.

The warm-up introduction passage 152 is a flow path for introducing the oxygen containing gas (heated gas) discharged from the compressor 154 into the case interior space S. The warm-up introduction passage 152 is connected between the bypass valve 164 and the switching valve 158 in the bypass flow path 150.

A pressure loss member 166 is installed in the warm-up introduction passage 152. The pressure loss member 166, by reducing the pressure of the oxygen containing gas, causes the temperature of the oxygen containing gas to rise. The pressure loss member 166, for example, includes a throttle section 168 having a flow path cross-sectional area which is smaller than the flow path cross-sectional area of the oxygen containing gas supply flow path 146. The throttle section 168 may be a throttle valve, or may be an orifice.

However, the pressure loss member 166 may adopt an appropriate configuration. Stated otherwise, the pressure loss member 166 may include a plurality of bent portions attached to the warm-up introduction passage 152. Although detailed illustration thereof is omitted, the cathode system device 18 includes cathode system auxiliary equipment (accessories). The cathode system auxiliary equipment includes an air cleaner, a gas/liquid separator, valves (other than the valves described above), and the like.

The cooling device 20 is equipped with a coolant supply flow path 170, a coolant discharge flow path 172, and a radiator 174. The coolant supply flow path 170 supplies the coolant stored in a non-illustrated coolant tank to the coolant inlet 42a of the fuel cell stack 12. The coolant that is delivered out from the coolant outlet 42b of the fuel cell stack 12 is guided to the coolant discharge flow path 172. The radiator 174 serves to cool by way of heat dissipation the coolant that is guided to the coolant discharge flow path 172. The coolant cooled by the radiator 174 is returned to the coolant supply flow path 170.

A coolant pump 176 and an intercooler introduction passage 178 are attached to the coolant supply flow path 170. The coolant pump 176 delivers the coolant to the fuel cell stack 12. Further, the coolant pump 176 also delivers the coolant to the intercooler 156 and the like. The intercooler introduction passage 178 is connected to a downstream side of the coolant pump 176 in the coolant supply flow path 170. The intercooler introduction passage 178 guides the coolant flowing through the coolant supply flow path 170 to the intercooler 156.

An intercooler lead out passage 179 is connected to the coolant discharge flow path 172. The intercooler lead out passage 179 guides the coolant that has flowed through the intercooler 156 to the coolant discharge flow path 172. The cooling device 20 includes cooling system auxiliary equipment. The cooling system auxiliary equipment includes a coolant tank, a filter, and the like.

The circuit for cooling the fuel cell stack 12 and the circuit for cooling the intercooler 156 may be systems that are separate from each other. In this case, a pump for allowing the coolant to flow to the intercooler 156 is disposed separately from the coolant pump 176.

The fuel cell system 10 which is configured in the manner described above comprises a control unit 180 (ECU) that controls operations of each of the components of the fuel cell system 10, and thereby generates electrical power in the fuel cell stack 12. The control unit 180 is a calculating device including a microcomputer, which includes a CPU (central processing unit), and a ROM, a RAM, and the like, serving as memories. The CPU, by reading and executing programs recorded in the ROM, functions as various function realizing units (function realizing means).

Output signals from a temperature sensor 182 for detecting the temperature of the joint separator 52 (the first separator member 48 or the second separator member 50) are input to the control unit 180. The temperature sensor 182 is a contact type of temperature sensor provided directly on the joint separator 52. As such a temperature sensor 182, for example, a thermocouple, a thermistor, or the like is used.

The temperature sensor 182 preferably detects the temperature of a site of the fuel cell stack 12 that is most difficult to heat when the fuel cell stack 12 is warmed up. More specifically, as shown in FIG. 2, the temperature sensor 182 detects the temperature at a lower end of one of the joint separators 52 that is closest to the second end plate 30b (i.e., the joint separator 52 adjacent to the second insulating plate 28b).

The temperature sensor 182 is mounted on the joint separator 52. The temperature sensor 182 may detect the temperature of a joint separator 52 that is closest to the first end plate 30a. Further, the temperature sensor 182 may detect the temperature of a joint separator 52 positioned at an intermediate portion of the cell stack body 24 in the stacking direction. Further, the temperature sensor 182 may detect the temperature of an upper end part (an end part in the direction of the arrow C2) or a side end part (an end part in the direction of the arrow B) of the joint separator 52. The temperature sensor 182 may be a non-contact type of temperature sensor such as an infrared temperature sensor or the like.

The temperature sensor 182 may be mounted on the stack case 14 in a manner so as to be capable of detecting the temperature of the case interior space S. In this case, the temperature sensor 182 can be mounted on the stack case 14 more easily than mounting of the temperature sensor 182 on the joint separator 52.

As shown in FIG. 1, the control unit 180 includes a compressor control unit 184, a valve control unit 186, a pump control unit 188, a temperature determination unit 190, and a storage unit 192.

The compressor control unit 184 controls operations of the compressor 154. The valve control unit 186 controls operations of a plurality of valves (the switching valve 158, the back pressure valve 162, the bypass valve 164, etc.). The pump control unit 188 controls operations of the coolant pump 176. The temperature determination unit 190 determines whether or not a detected temperature T detected by the temperature sensor 182 is less than or equal to a predetermined temperature threshold value Ta. The temperature threshold value Ta is set beforehand and stored in the storage unit 192.

As shown in FIG. 9, the temperature threshold Ta is set based on a relationship between the temperatures of the first rubber seal 94 and the second rubber seal 112 of the fuel cell stack 12, and an amount of leakage (leakage amount) of the fuel gas of the fuel cell stack 12. Moreover, in the following description, the first rubber seal 94 and the second rubber seal 112 may simply be referred to as "rubber seals 194".

For example, in a case where the rubber seals 194 are constituted by foamed fluororubber, when the fuel cell stack 12 is started for the first time, as shown by the dashed line L1 in FIG. 9, leakage of the fuel gas occurs in a temperature range that is lower than the temperature T0. However, when the time over which the fuel cell stack 12 is used becomes prolonged, the surface pressure of the rubber seals 194 decreases due to creep of the rubber seals 194, and therefore, as shown by the solid line L2 in FIG. 9, a fuel gas leak generation starting temperature T1 becomes higher than the temperature T0.

Therefore, according to the present embodiment, the temperature threshold value Ta is set to the fuel gas leak generation starting temperature T1 after such creep has occurred in the rubber seals 194, in terms of the temperature of the joint separator 52. Moreover, the temperature threshold value Ta is lower than 0° C.

Next, a description will be given concerning a method of low temperature starting of the fuel cell system 10.

Figure 10B:
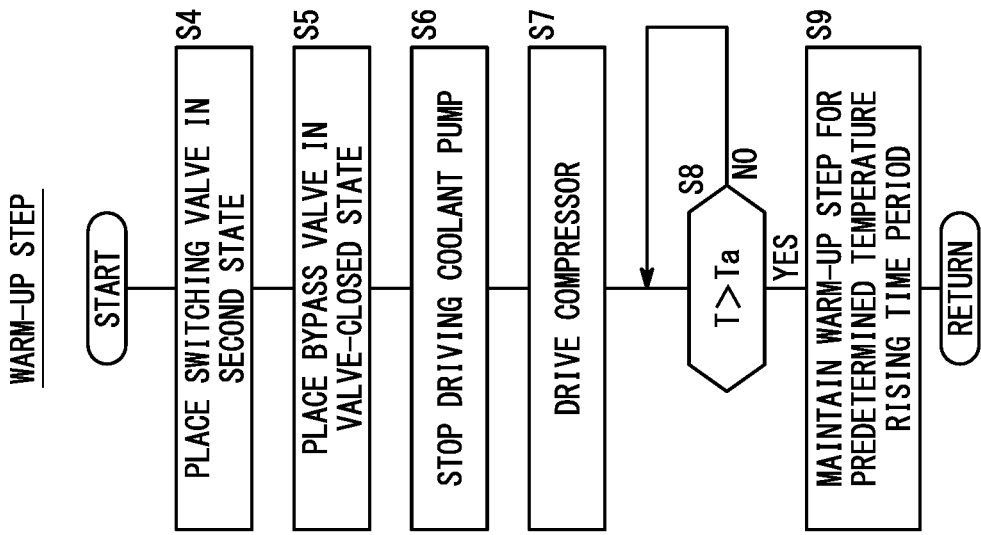
FIG. 10B is a flowchart illustrating a warm-up step of FIG. 10A.
Figure 10A:
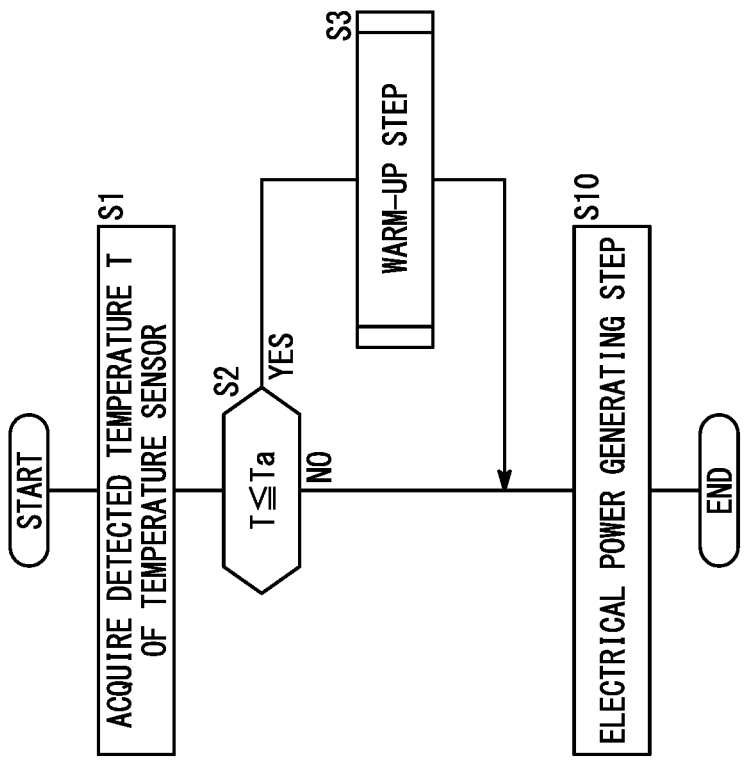
FIG. 10A is a flowchart illustrating a method of low temperature starting of the fuel cell system shown in FIG. 1.

As shown in FIG. 10A, in the low temperature starting method of the fuel cell system 10, initially, the control unit 180 acquires a detected temperature T of the temperature sensor 182 (step S1).

Subsequently, the temperature determination unit 190 determines whether or not the detected temperature T is less than or equal to the temperature threshold value Ta (step S2). In the case that the detected temperature T is less than or equal to the temperature threshold value Ta (step S2: YES), since there is a possibility that the fuel gas may leak from the rubber seals 194, a warm-up step (step S3) is initiated. Moreover, in the case that the detected temperature T is higher than the temperature threshold value Ta (step S2: NO), the electrical power generating step (step S10) is initiated.

More specifically, as shown in FIG. 10B, in the warm-up step, the valve control unit 186 places the switching valve 158 (the three-way valve 160) in the second state (step S4). Consequently, the upstream side flow path 146a and the bypass flow path 150 are placed in communication with each other, and communication between the downstream side flow path 146b and the upstream side flow path 146a is blocked, together with blocking communication between the downstream side flow path 146b and the bypass flow path 150.

Further, the valve control unit 186 controls the bypass valve 164 to be placed in a valve-closed state (step S5). Furthermore, the pump control unit 188 stops driving the coolant pump 176 (step S6). Thereafter, the compressor control unit 184 drives the compressor 154 (step S7). Moreover, in the warm-up step, the valve control unit 186 controls the supply valve of the fuel gas tank 140 to be placed in a valve-closed state. Therefore, the fuel gas is not supplied to the fuel cell stack 12 from the fuel gas tank 140.

Figure 11:
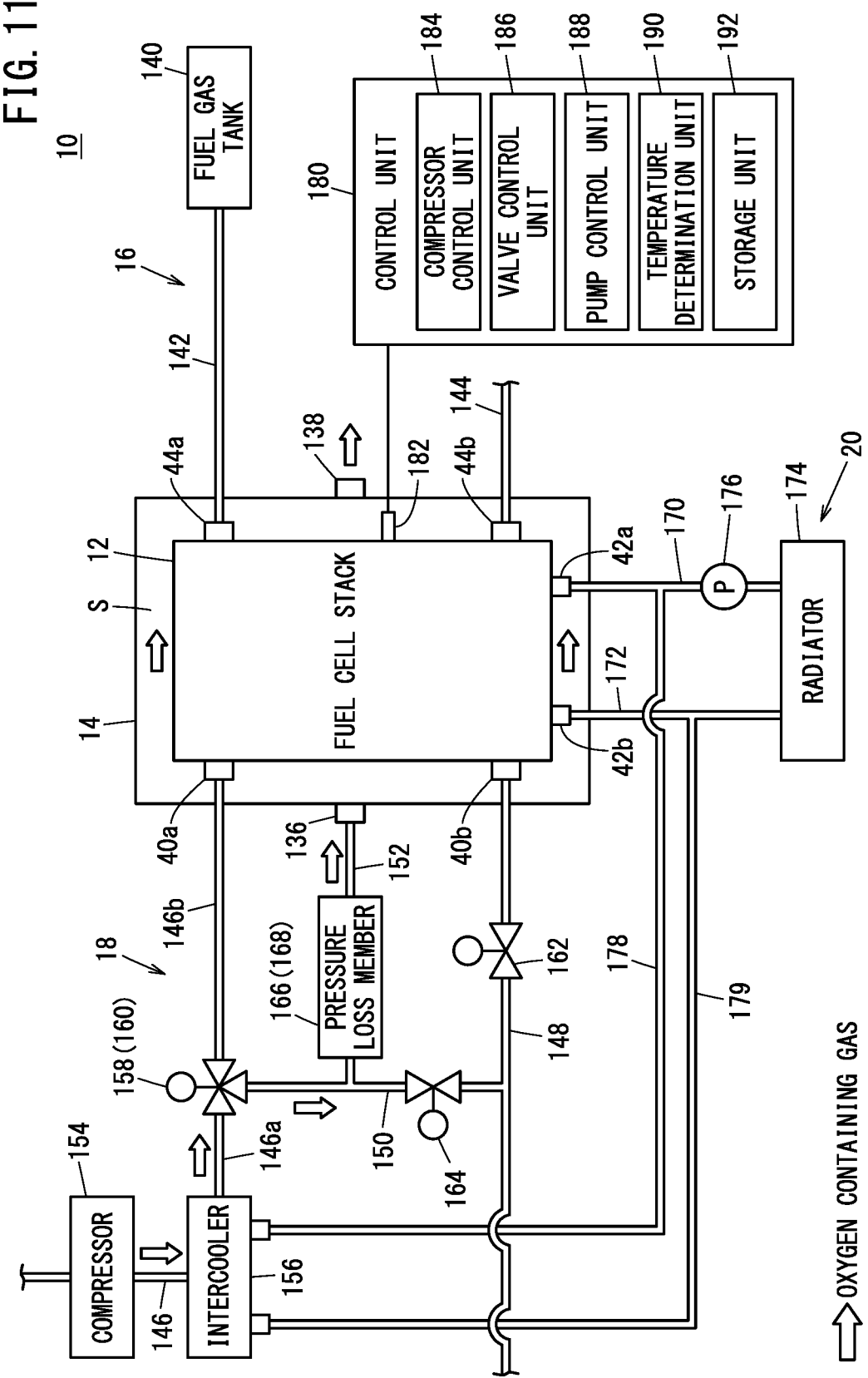
FIG. 11 is an explanatory diagram of the warm-up step.

Upon performing the above actions, as shown in FIG. 11, the oxygen containing gas discharged from the compressor 154 (air having a temperature that is higher than the temperature of the outside air) passes through the intercooler 156. At this time, since driving of the coolant pump 176 is stopped and the coolant does not flow into the intercooler 156, the oxygen containing gas is prevented from being cooled by the intercooler 156.

The oxygen containing gas that has passed through the intercooler 156 is guided to the warm-up introduction passage 152 via the switching valve 158 (the three-way valve 160) and the bypass flow path 150. At this time, since the bypass valve 164 is in a closed state, the oxygen containing gas guided to the bypass flow path 150 is not discharged into the oxygen containing gas discharge flow path 148. Further, the oxygen containing gas that has been guided to the warm-up introduction passage 152 is subjected to further heating when flowing through the pressure loss member 166 (the throttle section 168), and is introduced into the introduction port 136 of the stack case 14.

As shown in FIGS. 2 and 3, the oxygen containing gas that has been introduced into the introduction port 136 of the stack case 14 spreads throughout the space case interior S in the widthwise direction (the direction of the arrow B) of the stack case 14. Subsequently, the oxygen containing gas flows through the case interior space S from one end toward the other end of the stack case 14 (in the direction of the arrow A2) and upwardly (in the direction of the arrow C2). Consequently, the rubber seals 194 of each of the power generation cells 22 are directly heated by the oxygen containing gas, and therefore, the temperature of the rubber seals 194 can be efficiently increased. The oxygen containing gas that has flowed to the other end (an end part in the direction of the arrow A2) of the stack case 14 is led out from the lead out port 138 to the exterior of the stack case 14.

Further, as shown in FIG. 10B, the temperature determination unit 190 determines whether or not the detected temperature T is higher than the temperature threshold value Ta (step S8). In the case that the detected temperature T is less than or equal to the temperature threshold value Ta (step S8: NO), the process of step S8 is repeatedly executed.

In the case that the detected temperature T has become higher than the temperature threshold value Ta (step S8:

YES), the control unit 180 maintains the warm-up step for a predetermined temperature rising time period (step S9). More specifically, the control unit 180 continues the warm-up step until an elapsed time from when the detection temperature T exceeds the temperature threshold value Ta reaches the predetermined temperature rising time period.

Since the fuel cell stack 12 has a relatively large heat capacity, time is required for the temperature to rise more than the periphery (the case interior space S) of the fuel cell stack 12. Therefore, at the time when the detected temperature T of the temperature sensor 182 has become higher than the temperature threshold value Ta, there is a possibility that (all of the rubber seals 194 of) the fuel cell stack 12 as a whole have not been sufficiently heated. Accordingly, so that the temperatures of all of the rubber seals 194 become higher than the aforementioned leak generation starting temperature T1, the warm-up step is continued even after the detected temperature T has become higher than the temperature threshold value Ta.

Thereafter, as shown in FIG. 10A, the electrical power generating step is performed (step S10). More specifically, in the electrical power generating step, the valve control unit 186 switches the switching valve 158 to the first state. Upon doing so, the upstream side flow path 146a and the downstream side flow path 146b are placed in communication with each other, and communication between the bypass flow path 150 and the upstream side flow path 146a is blocked, together with blocking communication between the bypass flow path 150 and the downstream side flow path 146b.

Figure 12:
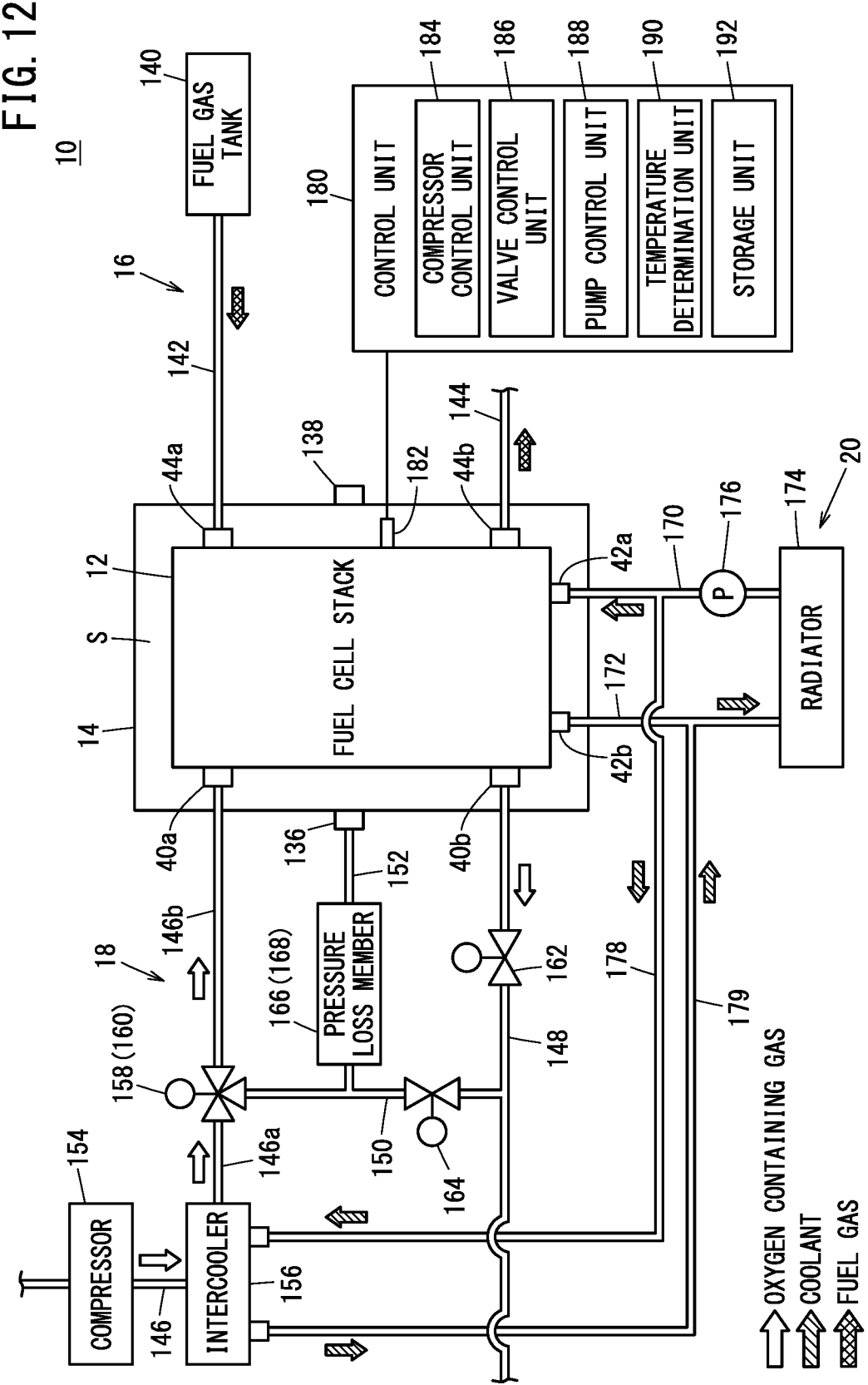
FIG. 12 is an explanatory diagram of an electrical power generating step.

Consequently, as shown in FIG. 12, the oxygen containing gas discharged from the compressor 154 is supplied to the oxygen containing gas inlet 40a of the fuel cell stack 12. At this time, the oxygen containing gas does not flow into the bypass flow path 150.

Further, the control unit 180 places the supply valve of the fuel gas tank 140 in a valve-open state. Upon doing so, the fuel gas in the fuel gas tank 140 is supplied to the fuel gas inlet 44a of the fuel cell stack 12 via the fuel gas supply flow path 142.

Furthermore, the pump control unit 188 drives the coolant pump 176. Upon doing so, the coolant inside the non-illustrated coolant tank is supplied by the coolant pump 176 to the coolant inlet 42a of the fuel cell stack 12.

Further, the coolant discharged from the coolant pump 176 is guided to the intercooler 156 from the intercooler introduction passage 178. Subsequently, after having flowed through the interior of the intercooler 156, the coolant is returned to the coolant discharge flow path 172 via the intercooler lead out passage 179. Consequently, the oxygen containing gas discharged from the compressor 154 is cooled by the intercooler 156. The coolant that is returned to the coolant discharge flow path 172 is cooled by the radiator 174, and thereafter, is guided to the coolant supply flow path 170.

As shown in FIGS. 4, 5, and 7, the oxygen containing gas supplied to the oxygen containing gas inlet 40a is introduced from the oxygen containing gas supply passage 72a into the oxygen containing gas flow field 80 of the first separator member 48. After having been introduced into the oxygen containing gas flow field 80, the oxygen containing gas moves in the direction of the arrow B along the oxygen containing gas flow field 80, and is supplied to the first electrode 60 of the MEA 54.

As shown in FIGS. 4, 5, and 8, the fuel gas supplied to the fuel gas inlet 44a is introduced from the fuel gas supply passage 76a into the fuel gas flow field 98 of the second separator main body 96. After having been introduced into the fuel gas flow field 98, the fuel gas moves in the direction of the arrow B along the fuel gas flow field 98, and is supplied to the second electrode 62 of the MEA 54.

Accordingly, in each of the MEAs 54, the oxygen containing gas supplied to the first electrode 60 and the fuel gas supplied to the second electrode 62 are consumed by undergoing electrochemical reactions in the first electrode catalyst layer 64 and the second electrode catalyst layer 68. As a result, generation of electrical power is carried out.

Next, as shown in FIGS. 1, 4, and 5, the oxygen containing exhaust gas supplied to and consumed by the first electrode 60 flows from the oxygen containing gas flow field 80 to the oxygen containing gas discharge passage 72b. The oxygen containing gas flows through the oxygen containing gas discharge passage 72b, and thereafter, is led out to the oxygen containing gas discharge flow path 148 from the oxygen containing gas outlet 40b. The fuel exhaust gas supplied to and consumed by the second electrode 62 flows from the fuel gas flow field 98 to the fuel gas discharge passage 76b. The fuel gas flows through the fuel gas discharge passage 76b, and thereafter, is led out to the fuel gas discharge flow path 144 from the fuel gas outlet 44b.

Further, as shown in FIG. 5, the coolant supplied to the coolant supply passage 74a is introduced into the coolant flow field 114 that is formed between the first separator member 48 and the second separator member 50. The coolant is introduced into the coolant flow field 114, and thereafter, flows in the direction of the arrow B. After having cooled the MEA 54, the coolant flows into the coolant discharge passage 74b. The coolant, after having flowed through the coolant discharge passage 74b, is led out from the coolant outlet 42b into the coolant discharge flow path 172 (refer to FIGS. 1, 4, and 5). After the electrical power generating step, the series of the flow of operations is brought to an end.

The present embodiment exhibits the following advantageous effects.

According to the fuel cell system 10 of the present embodiment, when the power generation cells 22 generate electrical power in a low temperature environment, by setting the switching valve 158 in the second state and driving the compressor 154, the relatively high temperature oxygen containing gas discharged from the compressor 154 can be introduced into the case interior space S in a state in which the temperature of the oxygen containing gas is raised by the pressure loss member 166. Consequently, it is possible to efficiently raise the temperature of the rubber seals 194 of the fuel cell stack 12. Further, by setting the switching valve 158 to the first state in which the rubber seals 194 are sufficiently raised in temperature, because the oxygen containing gas discharged from the compressor 154 is supplied to the interior of the fuel cell stack 12, the generation of electrical power by the plurality of power generation cells 22 can be initiated. Accordingly, with a simple configuration, the temperature of the rubber seals 194 can be efficiently raised. Consequently, when the power generation cells 22 generate electrical power in a low temperature environment, leakage of the fuel gas from the rubber seals 194 can be effectively suppressed.

According to the method of low temperature starting of the fuel cell system 10 of the present embodiment, the warm-up step for warming up the fuel cell stack 12 is performed in which the relatively high temperature oxygen containing gas discharged from the compressor 154 is made to flow through the pressure loss member 166, and is introduced into the case interior space S in a state in which the temperature thereof is raised. Therefore, it is possible to efficiently raise the temperature of the rubber seals 194 of the fuel cell stack 12 in a low temperature environment. Further, after having completed the warm-up step, the electrical power generating step of initiating the generation of electrical power is performed by supplying to the power generation cells 22 the oxygen containing gas discharged from the compressor 154, together with supplying the fuel gas to the power generation cells 22. Accordingly, with a simple configuration, the temperature of the rubber seals 194 can be efficiently raised. Consequently, when the power generation cells 22 generate electrical power in a low temperature environment, leakage of the fuel gas from the rubber seals 194 can be effectively suppressed.

The pressure loss member 166 includes the throttle section 168 having a flow path cross-sectional area which is smaller than the flow path cross-sectional area of the oxygen containing gas supply flow path 146.

In accordance with such a configuration, by means of a simple configuration, a loss in pressure of the oxygen containing gas can be increased.

The stack case 14 includes the introduction port 136 and the lead out port 138. The introduction port 136 introduces the oxygen containing gas led out from the warm-up introduction passage 152 into the case interior space S. The lead out port 138 discharges the gas in the case interior space S to the exterior of the stack case 14.

Further, in the warm-up step, the oxygen containing gas is introduced from the introduction port 136 of the stack case 14 into the case interior space S, and the gas in the case interior space S is led out from the lead out port 138 of the stack case 14 to the exterior of the stack case 14.

In this case, the gas of the case interior space S is led out from the lead out port 138 to the exterior of the stack case 14. Therefore, the oxygen containing gas can be efficiently introduced from the introduction port 136 into the case interior space S.

The introduction port 136 is positioned on a lower part of the stack case 14. The lead out port 138 is positioned on an upper part of the stack case 14.

In accordance with such a configuration, the oxygen containing gas introduced into the case interior space S from the introduction port 136 can be made to flow from the lower part toward the upper part of the stack case 14. Consequently, it is possible to efficiently raise the temperature of the entire fuel cell stack 12.

The introduction port 136 is positioned at one end part of the stack case 14 in the stacking direction. The lead out port 138 is positioned at another end part of the stack case 14 in the stacking direction.

In accordance with such a configuration, the oxygen containing gas introduced into the case interior space S from the introduction port 136 can be made to flow from the one end toward the other end of the stack case 14. Consequently, it is possible to efficiently raise the temperature of the entire fuel cell stack 12.

The fuel cell system 10 includes the temperature sensor 182 that detects the temperature of the joint separator 52 that is positioned farthest away from the introduction port 136. The warm-up step is performed in the case that the detected temperature T of the temperature sensor 182 is less than or equal to the temperature threshold value Ta, and the electrical power generating step is performed after the detected temperature T has become higher than the temperature threshold value Ta.

In accordance with such a method, the electrical power generating step can be carried out after having caused the temperature of the rubber seals 194 to be raised to a temperature higher than the leak generation starting temperature T1.

The fuel cell system 10 includes the oxygen containing gas discharge flow path 148, the bypass flow path 150, and the bypass valve 164. The oxygen containing gas discharge flow path 148 discharges, from the fuel cell stack 12, the oxygen containing exhaust gas that has flowed through each of the power generation cells 22. The bypass flow path 150 connects the oxygen containing gas discharge flow path 148 and the oxygen containing gas supply flow path 146. The bypass valve 164 serves to open and close the bypass flow path 150. The bypass flow path 150 includes a first end part connected to the oxygen containing gas supply flow path 146, and a second end part connected to the oxygen containing gas discharge flow path 148. The warm-up introduction passage 152 is connected to a portion of the bypass flow path 150 between the bypass valve 164 and the first end part of the bypass flow path 150.

Further, in the warm-up step, the oxygen containing gas discharged from the compressor 154 is guided to the case interior space S via the oxygen containing gas supply flow path 146, the bypass flow path 150, and the warm-up introduction passage 152. Furthermore, in the warm-up step, the bypass valve 164 is placed in a closed state in which the bypass flow path 150 is closed.

In this case, with a simple configuration, the oxygen containing gas discharged from the compressor 154 can be guided to the warm-up introduction passage 152 via the switching valve 158 and the bypass flow path 150. Further, at this time, by placing the bypass valve 164 in a valve-closed state, it is possible to prevent the oxygen containing gas from being discharged into the oxygen containing gas discharge flow path 148.

The fuel cell system 10 is equipped with the intercooler 156 and the coolant pump 176. The intercooler 156 is installed on the upstream side of the connected portion with the bypass flow path 150 in the oxygen containing gas supply flow path 146, and thereby cools the oxygen containing gas. The coolant pump 176 causes the coolant to flow through the intercooler 156. In the warm-up step, driving of the coolant pump 176 is stopped. In the electrical power generating step, the coolant pump 176 is driven.

In accordance with such a method, at the time of the warm-up step, it is possible to prevent the oxygen containing gas discharged from the compressor 154 from being cooled by the intercooler 156. Further, at the time of the electrical power generating step, the oxygen gas discharged from the compressor 154 can be appropriately cooled.

Next, a description will be given concerning a stack case 14a according to a modified example. Moreover, in the stack case 14a, the same reference numerals are used to designate the same constituent elements as those of the above-described stack case 14, and detailed description of such features will be omitted.

Figure 13:
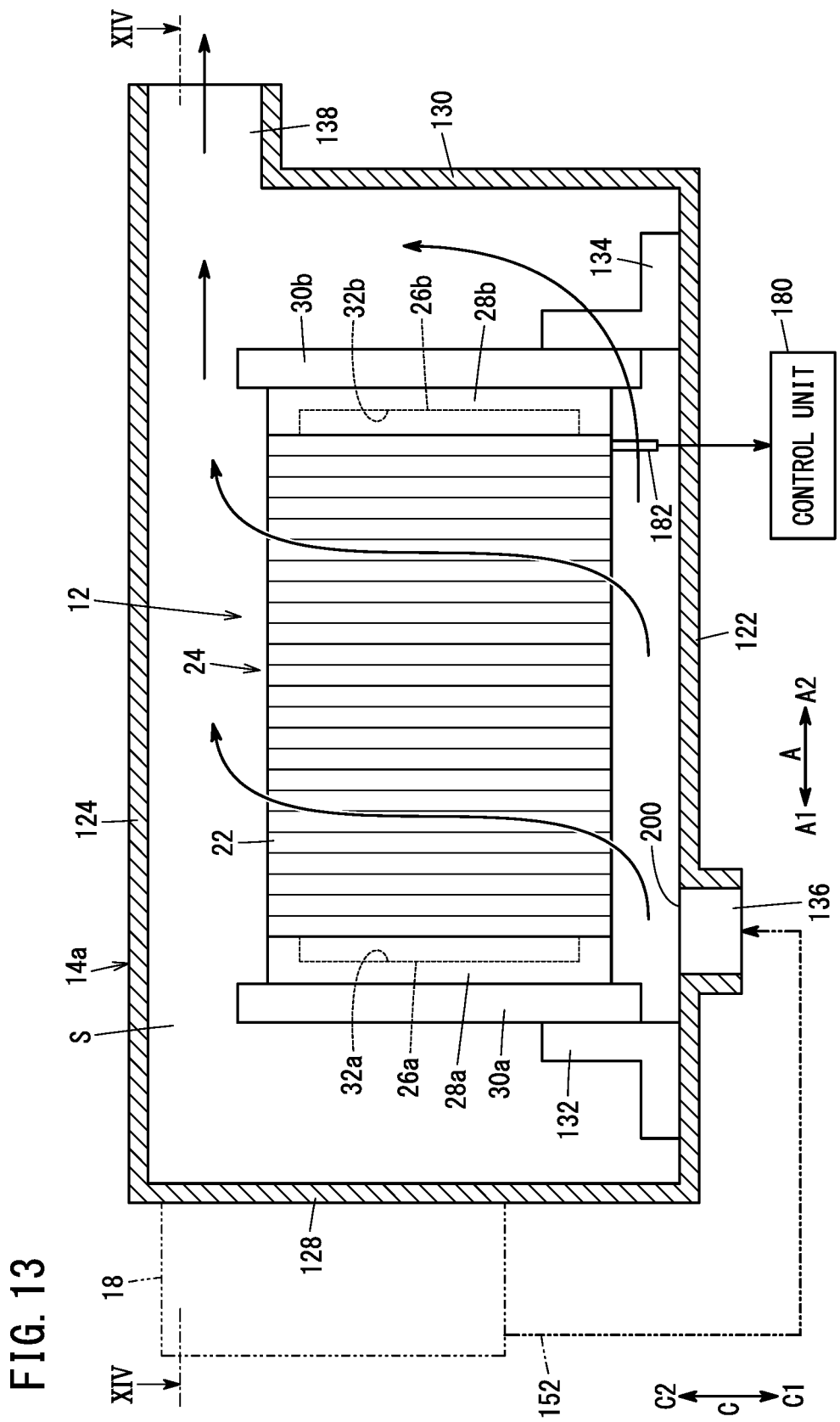
FIG. 13 is a cross-sectional explanatory diagram of the stack case according to a modified example.
Figure 14:
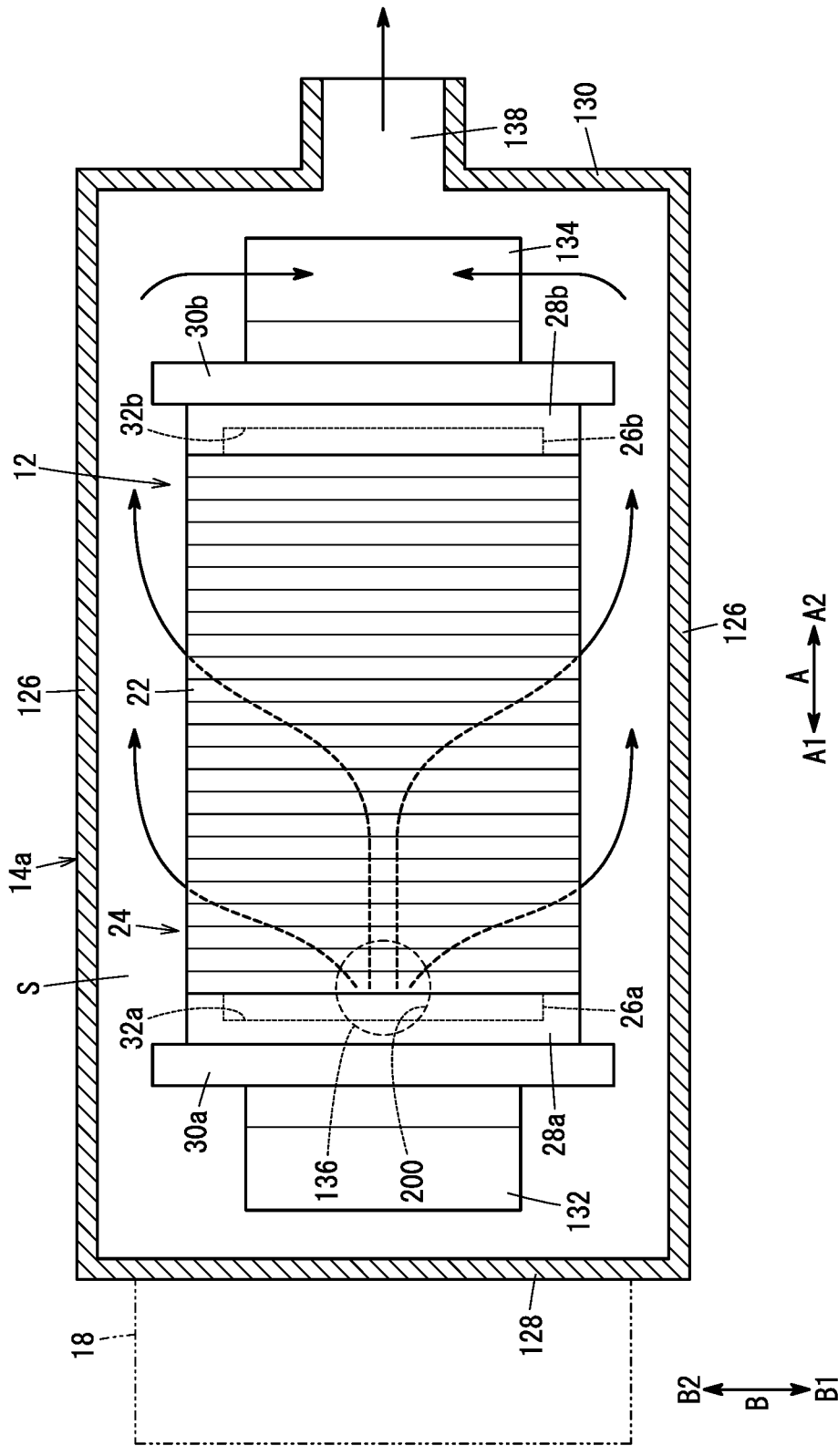
FIG. 14 is an explanatory cross-sectional view taken along line XIV-XIV of FIG. 13.

As shown in FIGS. 13 and 14, in the stack case 14a, the introduction port 136 is positioned on the lower wall portion 122. The introduction port 136 is positioned between the center of the stack case 14a in the stacking direction and one end part (the first end wall portion 128) of the stack case 14a. More specifically, the introduction port 136 is positioned below the one end part of the cell stack body 24. An opening 200 of the introduction port 136 on the side of the case interior space S faces toward a central portion in the widthwise direction (the direction of the arrow B) of the cell stack body 24.

In the stack case 14a that is configured in this manner, the opening 200 of the introduction port 136 on the side of the case interior space S faces toward the cell stack body 24.

In accordance with such a configuration, the oxygen containing gas that is guided from the introduction port 136 can be directly guided to the cell stack body 24. Consequently, the rubber seals 194 can be efficiently heated by the oxygen containing gas.

Second Embodiment

Next, a description will be given concerning a fuel cell system 10A according to a second embodiment of the present invention. Moreover, in the fuel cell system 10A according to the second embodiment, the same reference numerals are used to designate the same constituent elements as those of the above-described fuel cell system 10, and detailed description of such features will be omitted.

Figure 15:
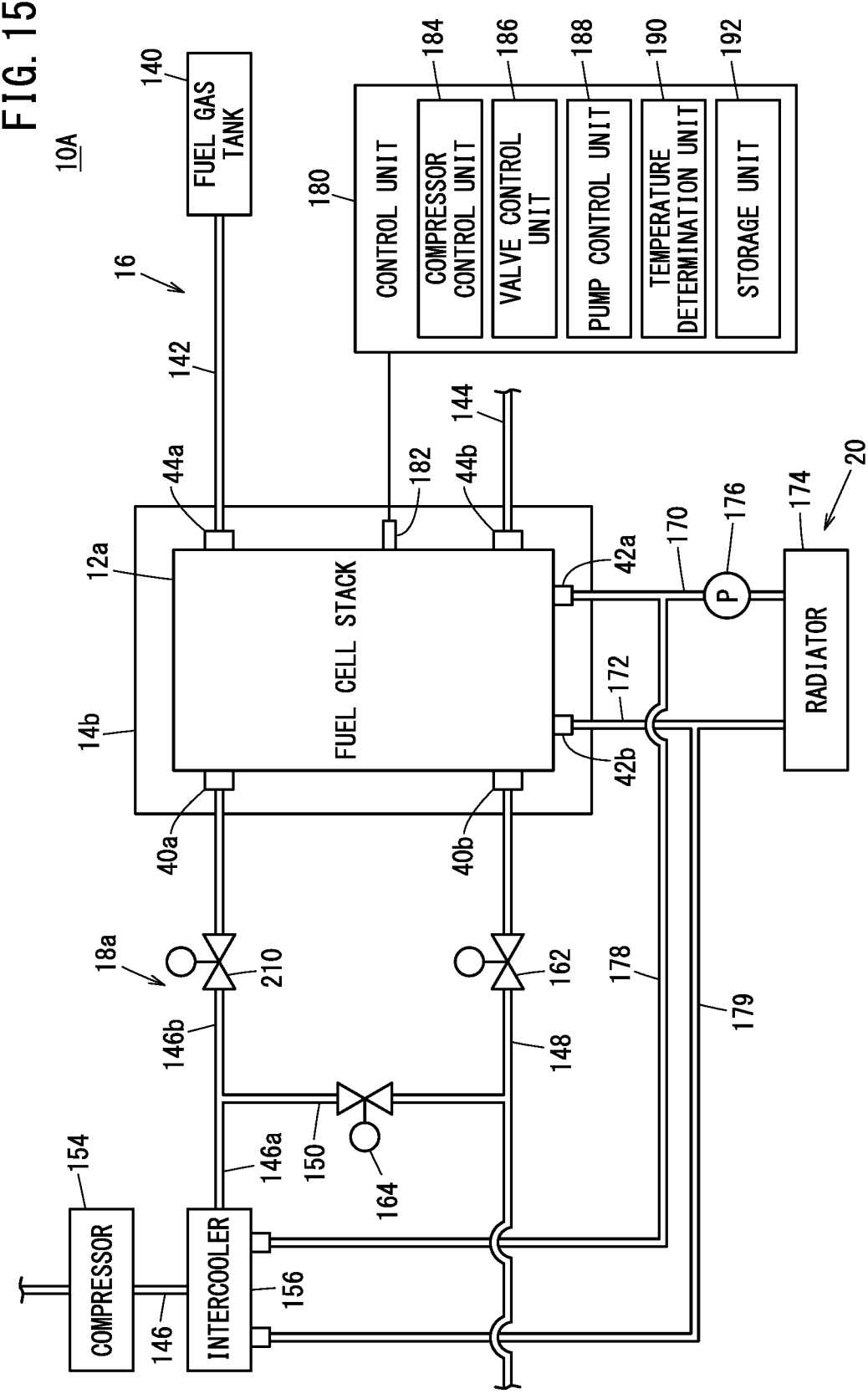
FIG. 15 is a schematic configuration diagram of a fuel cell system according to a second embodiment of the present invention.

As shown in FIG. 15, the fuel cell system 10A is equipped with a fuel cell stack 12a, a stack case 14b, the anode system device 16, a cathode system device 18a, and the cooling device 20.

Figure 16:
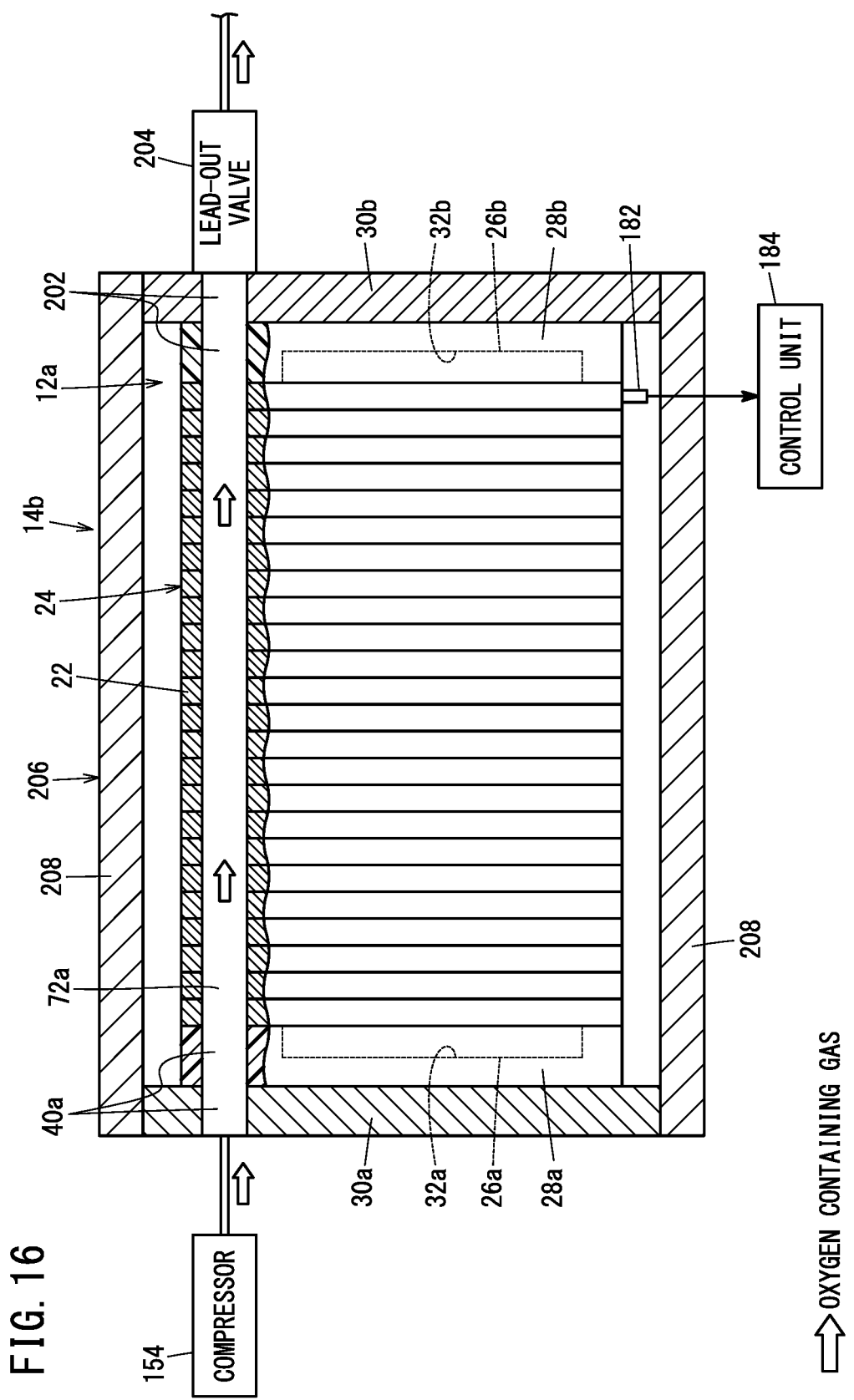
FIG. 16 is a cross-sectional explanatory diagram of a fuel cell stack and a stack case shown in FIG. 15.

As shown in FIG. 16, the fuel cell stack 12a includes the cell stack body 24, the first terminal member 26a, the first insulating plate 28a, the first end plate 30a, the second terminal member 26b, the second insulating plate 28b, and the second end plate 30b. The cell stack body 24 includes a plurality of power generation cells 22 that are stacked on each other. The second insulating plate 28b and the second end plate 30b include a warm-up oxygen containing gas outlet 202 in order to lead the oxygen containing gas of the oxygen containing gas supply passage 72a to the exterior of the fuel cell stack 12a.

The fuel cell stack 12a includes a lead out valve 204 that is capable of switching between a first state and a second state. In the first state, the lead out valve 204 permits the oxygen containing gas to be taken out from the warm up oxygen containing gas outlet 202 to the exterior. In the second state, the lead out valve 204 blocks the oxygen containing gas from being taken out from the warm-up oxygen containing gas outlet 202 to the exterior. The lead out valve 204 is disposed on the second end plate 30b. Moreover, the valve control unit 186 (refer to FIG. 15) controls operations of the lead out valve 204.

The stack case 14b includes a cover member 206, the first end plate 30a, and the second end plate 30b. The cover member 206 covers the cell stack body 24 from directions perpendicular to the stacking direction (the direction of the arrow B and the direction of the arrow C). The first end plate 30a and the second end plate 30b make up portions of the stack case 14b. The cover member 206, for example, includes four panels 208. The panels 208 are fixed, by non-illustrated bolts, respectively to a side surface of the first end plate 30a and a side surface of the second end plate 30b. However, the cover member 206 may be integrally extruded into a quadrangular cylindrical shape.

As shown in FIG. 15, the cathode system device 18a is equipped with the oxygen containing gas supply flow path 146, the oxygen containing gas discharge flow path 148, and the bypass flow path 150. The compressor 154, the intercooler 156, and an opening/closing valve 210 are installed in the oxygen containing gas supply flow path 146. The opening/closing valve 210 is installed in the downstream side flow path 146b. In particular, the opening/closing valve 210 is capable of being switched between a valve-open state in which the downstream side flow path 146b is opened, and a valve-closed state in which the downstream side flow path 146b is closed. The valve control unit 186 controls operations of the opening/closing valve 210.

The low temperature starting method of the fuel cell system 10A according to the present embodiment differs from the above-described low temperature starting method of the fuel cell system 10 only in relation to the warm-up step. Therefore, the warm-up step will be described below.

Figure 17:
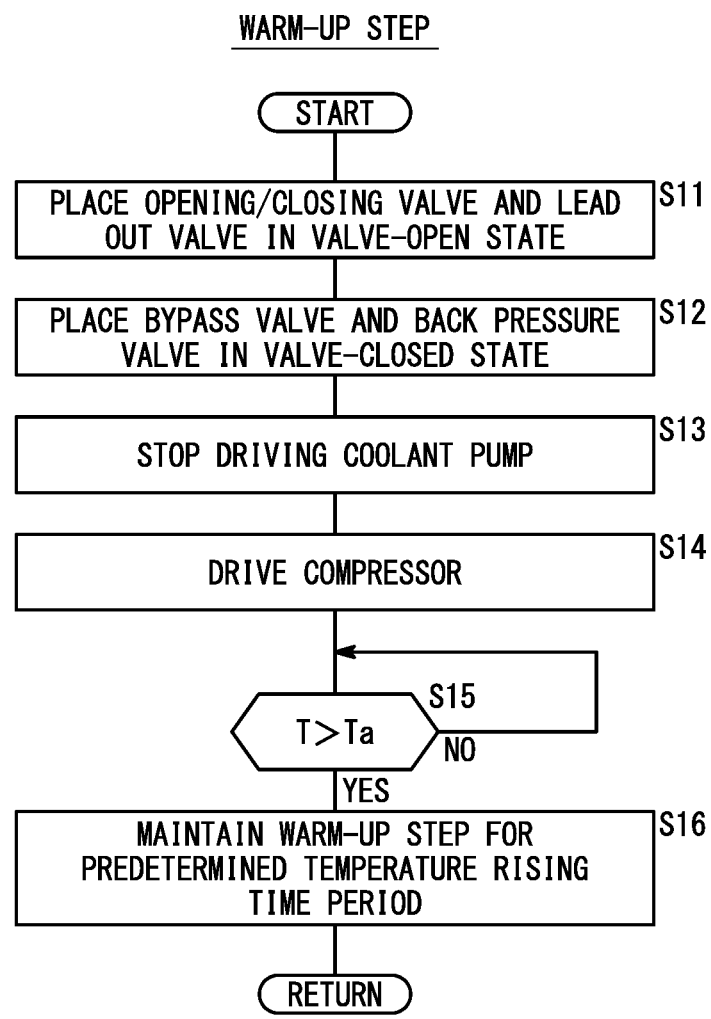
FIG. 17 is a flowchart illustrating a warm-up step of a method of low temperature starting of the fuel cell system shown in FIG. 15.

As shown in FIG. 17, in the warm-up step, the valve control unit 186 places the opening/closing valve 210 and the lead out valve 204 in a valve-open state (step S11). Further, the valve control unit 186 places the bypass valve 164 and the back pressure valve 162 in a valve-closed state (step S12). Furthermore, the pump control unit 188 stops driving the coolant pump 176 (step S13). Thereafter, the compressor control unit 184 drives the compressor 154 (step S14). Moreover, in the warm-up step, the valve control unit 186 controls the supply valve of the fuel gas tank 140 to be placed in a valve-closed state. Therefore, the fuel gas is not supplied to the fuel cell stack 12a from the fuel gas tank 140.

Upon performing the above actions, the oxygen containing gas discharged from the compressor 154 (air having a temperature that is higher than the temperature of the outside air) passes through the intercooler 156. At this time, since driving of the coolant pump 176 is stopped and the coolant does not flow into the intercooler 156, the oxygen containing gas is prevented from being cooled by the intercooler 156.

The oxygen containing gas that has passed through the intercooler 156 is supplied to the oxygen containing gas inlet 40a via the downstream side flow path 146b. At this time, by placing the bypass valve 164 in a valve-closed state, the oxygen containing gas is not discharged into the oxygen containing gas discharge flow path 148.

As shown in FIG. 16, the oxygen containing gas discharged from the compressor 154 and supplied to the oxygen containing gas inlet 40a flows through the oxygen containing gas supply passage 72a toward the second end plate 30b (in the direction of the arrow A2). After having flowed through the oxygen containing gas supply passage 72a, the oxygen containing gas is led out to the exterior of the fuel cell stack 12a (the exterior of the stack case 14b) via the warm-up oxygen containing gas outlet 202 and the lead out valve 204. At this time, since the back pressure valve 162 is placed in a closed state, flowing of the oxygen containing gas from the oxygen containing gas supply passage 72a to the oxygen containing gas flow field 80 (the electrical power generating region 23) is suppressed. Consequently, it is possible to prevent the electrolyte membrane 58 from being excessively dried by the oxygen containing gas. Further, it is possible to prevent the catalyst of the first electrode catalyst layer 64 from being deteriorated by the oxygen containing gas.

The oxygen containing gas that flows through the oxygen containing gas supply passage 72a raises the temperature of the fuel cell stack 12a as a whole. Consequently, the temperature of the rubber seals 194 of each of the electrical power generation cells 22 can be efficiently increased.

Thereafter, steps S15 and S16 of FIG. 17 are performed. Since the processes of step S15 and step S16 are the same as the processes of step S8 and step S9 of FIG. 10B, which were described above, description of these steps will be omitted.

In accordance with the fuel cell system 10A according to the present embodiment, when the power generation cells 22 generate electrical power in a low temperature environment, by placing the lead out valve 204 in the first state and driving the compressor 154, the relatively high temperature oxygen containing gas discharged from the compressor 154 can be made to flow through the oxygen containing gas supply passage 72a. Consequently, it is possible to efficiently raise the temperature of the rubber seals 194 of the fuel cell stack 12a. Further, by setting the lead out valve 204 to the second state in a state in which the rubber seals 194 are sufficiently raised in temperature, the oxygen containing gas discharged from the compressor 154 is supplied to the electrical power generating regions 23 of each of the power generation cells 22. Therefore, the generation of electrical power by the plurality of power generation cells 22 can be initiated. Accordingly, with a simple configuration, the temperature of the rubber seals 194 can be efficiently raised. Consequently, when the power generation cells 22 generate electrical power in a low temperature environment, leakage of the fuel gas from the rubber seals 194 can be effectively suppressed.

In accordance with the method of low temperature starting of the fuel cell system 10A according to the present embodiment, the warm-up step for warming up the fuel cell stack 12a is performed by setting the lead out valve 204 in the first state, and thereby causing the relatively high temperature oxygen containing gas discharged from the compressor 154 to flow through the oxygen containing gas supply passage 72a. Therefore, it is possible to efficiently raise the temperature of the rubber seals 194 of the fuel cell stack 12a in a low temperature environment. Further, after having completed the warm-up step, the electrical power generating step of initiating the generation of electrical power is performed in which the lead out valve 204 is set in the second state, and the oxygen containing gas discharged from the compressor 154 is supplied to the electrical power generating regions 23 of the power generation cells 22, together with supplying the fuel gas to the electrical power generating regions 23 of the power generation cells 22. Accordingly, with a simple configuration, the temperature of the rubber seals 194 can be efficiently raised. Consequently, when the power generation cells 22 generate electrical power in a low temperature environment, leakage of the fuel gas from the rubber seals 194 can be effectively suppressed.

The fuel cell system 10A includes the oxygen containing gas discharge flow path 148 and the back pressure valve 162. The oxygen containing gas discharge flow path 148 discharges, from the fuel cell stack 12a, the oxygen containing exhaust gas that has flowed through the plurality of power generation cells 22. The back pressure valve 162 opens and closes the oxygen containing gas discharge flow path 148. In the warm-up step, the back pressure valve 162 is placed in a valve-closed state in which the oxygen containing gas discharge flow path 148 is closed.

In accordance with such a method, since the back pressure valve 162 is placed in a closed state during the warm-up step, it is possible to suppress the oxygen containing gas flowing through the oxygen containing gas supply passage 72a from being guided to the electrical power generating region 23 (the oxygen containing gas flow field 80). Consequently, at the time of the warm-up step, it is possible to prevent the electrolyte membrane 58 from being excessively dried by the oxygen containing gas. Further, it is possible to prevent the catalyst of the first electrode catalyst layer 64 from being deteriorated by the oxygen containing gas.

Third Embodiment

Next, a description will be given concerning a fuel cell system 10B according to a third embodiment of the present invention. Moreover, in the fuel cell system 10B according to the third embodiment, the same reference numerals are used to designate the same constituent elements as those of the above-described fuel cell system 10, and detailed description of such features will be omitted.

Figure 18:
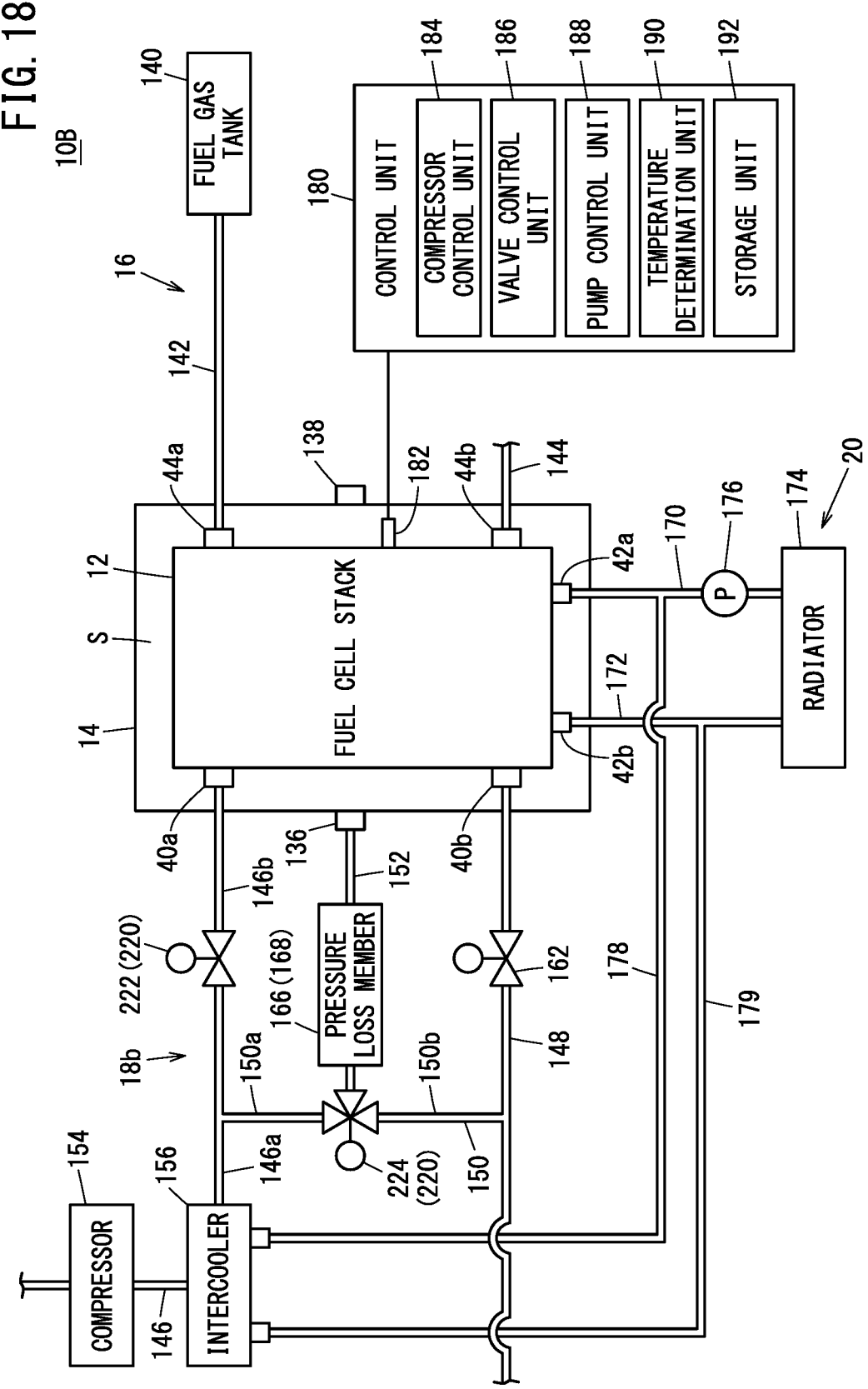
FIG. 18 is a schematic configuration diagram of a fuel cell system according to a third embodiment of the present invention.

As shown in FIG. 18, the fuel cell system 10B is equipped with the stack case 14, the anode system device 16, a cathode system device 18b, and the cooling device 20. The cathode system device 18b comprises a switching unit 220 that is capable of switching between a first state and a second state. In the first state, the switching unit 220 permits the oxygen containing gas from the oxygen containing gas supply flow path 146 to be supplied to the fuel cell stack 12, together with blocking introduction of the oxygen containing gas from the oxygen containing gas supply flow path 146 into the case interior space S via the warm-up introduction passage 152. In the second state, the switching unit 220 blocks supply of the oxygen containing gas from the oxygen containing gas supply flow path 146 into the fuel cell stack 12, together with permitting introduction of the oxygen containing gas from the oxygen containing gas supply flow path 146 into the case interior space S via the warm-up introduction passage 152.

The switching unit 220 includes an opening/closing valve 222 and a bypass valve 224. The opening/closing valve 222 is installed in the downstream side flow path 146b. The bypass valve 224 is installed at a connected portion between the bypass flow path 150 and the warm-up introduction passage 152. In the first state of the switching unit 220, the opening/closing valve 222 opens the downstream side flow path 146b. In the second state of the switching unit 220, the opening/closing valve 222 closes the downstream side flow path 146b.

The bypass valve 224 is a three-way valve. In the first state of the switching unit 220, the bypass valve 224 causes the warm-up introduction passage 152 to communicate with a flow path 150a lying between the bypass valve 224 of the bypass flow path 150 and the oxygen containing gas supply flow path 146, and blocks communication between the flow path 150a and a flow path 150b lying between the bypass valve 224 of the bypass flow path 150 and the oxygen containing gas discharge flow path 148, together with blocking communication between the flow path 150b and the warm-up introduction passage 152. In the second state of the switching unit 220, the bypass valve 224 places the flow path 150a and the warm-up introduction passage 152 in communication with each other, and blocks communication between the flow path 150a and the flow path 150b, together with blocking communication between the flow path 150b and the warm-up introduction passage 152.

According to the present embodiment, at the time of the warm-up step, the valve control unit 186 controls the opening/closing valve 222 and the bypass valve 224 so that the switching unit 220 is placed in the second state. Consequently, the oxygen containing gas discharged from the compressor 154 (air having a temperature that is higher than the temperature of the outside air) is guided to the warm-up introduction passage 152 via the intercooler 156, the flow path 150a, and the bypass valve 224. Therefore, the present embodiment exhibits the same advantageous effects as those of the above-described fuel cell system 10 according to the first embodiment.

The present invention is not limited to the embodiments described above, and it goes without saying that various modified or additional configurations could be adopted therein without departing from the essence and gist of the present invention.

The embodiments described above can be summarized in the following manner.

According to the above-described embodiments, the fuel cell system (10, 10A, 10B) is disclosed, including the fuel cell stack (12, 12*a*) including the cell stack body (24) in which there are stacked the plurality of power generation cells (22) each containing the MEA (membrane electrode assembly) member (46) configured to generate electrical power due to the electrochemical reaction between the oxygen containing gas and the fuel gas, and two separator members (48, 50) arranged on both sides of the MEA member, the stack case (14, 14*a*, 14*b*) in which the fuel cell stack is accommodated, the oxygen containing gas supply flow path (146) that supplies the oxygen containing gas to the fuel cell stack, and the compressor (154) disposed in the oxygen containing gas supply flow path, wherein each of the two separator members includes the metal separator main bodies (78, 96), the separator main bodies are integrally formed with seal bead portions (92, 110) in order to prevent leakage of a fluid, which is the oxygen containing gas, the fuel gas, or the coolant, the seal bead portions protrude from the separator main bodies in the stacking direction of the plurality of power generation cells, and the rubber seal (194) is interposed between the top parts (92*a*, 110*a*) of the seal bead portions and the MEA member, the fuel cell system further including the warm-up introduction passage (152) that introduces the oxygen containing gas, which is discharged from the compressor into the oxygen containing gas supply flow path, into the case interior space (S) between the stack case and the fuel cell stack, and the switching unit (158, 220) which is capable of switching between the first state in which supply of the oxygen containing gas from the oxygen containing gas supply flow path into the fuel cell stack is permitted, together with blocking introduction of the oxygen containing gas from the oxygen containing gas supply flow path into the case interior space via the warm-up introduction passage, and the second state in which supply of the oxygen containing gas from the oxygen containing gas supply flow path into the fuel cell stack is blocked, together with permitting introduction of the oxygen containing gas from the oxygen containing gas supply flow path into the case interior space via the warm-up introduction passage, wherein the pressure loss member (166), which causes a loss in pressure of the oxygen containing gas flowing through the warm-up introduction passage to be increased, is installed in the warm-up introduction passage.

In the above-described fuel cell system, the pressure loss member may include the throttle section (168) having the flow path cross-sectional area which is smaller than the flow path cross-sectional area of the oxygen containing gas supply flow path.

In the above-described fuel cell system, the stack case may include the introduction port (136) that introduces the oxygen containing gas led out from the warm-up introduction passage into the case interior space, and the lead out port (138) that discharges the gas from the case interior space to the exterior of the stack case.

In the above-described fuel cell system, the introduction port may be positioned on the lower part of the stack case, and the lead out port may be positioned on the upper part of the stack case.

In the above-described fuel cell system, the introduction port may be positioned at a portion between a center of the stack case and one end part of the stack case in the stacking direction, or at the one end part of the stack case, and the lead out port may be positioned at a portion between the center of the stack case and another end part of the stack case in the stacking direction, or at the other end part of the stack case.

In the above-described fuel cell system, the opening (200) of the introduction port, which is in communication with the case interior space, may face toward the cell stack body.

In the above-described fuel cell system, there may further be provided the oxygen containing gas discharge flow path (148) that discharges from the fuel cell stack the oxygen containing exhaust gas that has flowed through the plurality of power generation cells, the bypass flow path (150) that connects the oxygen containing gas discharge flow path and the oxygen containing gas supply flow path, and the bypass valve (164) that opens and closes the bypass flow path, wherein the bypass flow path may include the first end part connected to the oxygen containing gas supply flow path, and the second end part connected to the oxygen containing gas discharge flow path, and the warm-up introduction passage may be connected to a portion of the bypass flow path between the bypass valve and the first end part.

In the above-described fuel cell system, the rubber seal may be constituted from a porous fluororubber.

According to the above-described embodiments, the fuel cell system is disclosed, the fuel cell system including the fuel cell stack including the cell stack body in which there are stacked the plurality of power generation cells each containing the MEA member that generates electrical power due to the electrochemical reaction between the oxygen containing gas and the fuel gas, and the two separator members arranged on both sides of the MEA member, the first end plate (30*a*) disposed on the one end of the cell stack body, and the second end plate (30*b*) disposed on the other end of the cell stack body, the oxygen containing gas supply flow path that supplies the oxygen containing gas to the fuel cell stack, and the compressor disposed in the oxygen containing gas supply flow path, wherein each of the two separator members includes the metal separator main bodies, the separator main bodies are integrally formed with the seal bead portions in order to prevent leakage of a fluid, which is the oxygen containing gas, the fuel gas, or the coolant, the seal bead portions protrude from the separator main body in the stacking direction of the plurality of power generation cells, the rubber seal is interposed between the top parts of the seal bead portions and the MEA member, and each of the plurality of power generation cells includes the oxygen containing gas supply passage (72*a*) through which the oxygen containing gas is supplied to the electrical power generating regions (23) of the plurality of power generation cells, wherein the first end plate includes the oxygen containing gas inlet (40*a*) that introduces the oxygen containing gas from the oxygen containing gas supply flow path into the oxygen containing gas supply passage, the second end plate includes the warm-up oxygen containing gas outlet (202) that delivers out the oxygen containing gas to the exterior of the fuel cell stack from the oxygen containing gas supply passage, and the fuel cell stack further includes the lead out valve (204) that is capable of switching between a first state in which leading out of the oxygen containing gas from the warm-up oxygen containing gas outlet to the exterior of the fuel cell stack is permitted, and a second state in which leading out of the oxygen containing gas from the warm-up oxygen containing gas outlet to the exterior of the fuel cell stack is blocked.

According to the above-described embodiments, the method of low temperature starting of the fuel cell system is disclosed, the fuel cell system including the fuel cell stack including the cell stack body in which there are stacked the plurality of power generation cells each containing the MEA member that generates electrical power due to the electrochemical reaction between the oxygen containing gas and the fuel gas, and the two separator members arranged on both sides of the MEA member, the stack case in which the fuel cell stack is accommodated, the oxygen containing gas supply flow path that supplies the oxygen containing gas to the fuel cell stack, and the compressor disposed in the oxygen containing gas supply flow path, wherein each of the two separator members includes the metal separator main bodies, the separator main bodies are integrally formed with the seal bead portions in order to prevent leakage of a fluid, which is the oxygen containing gas, the fuel gas, or the coolant, the seal bead portions protrude from the separator main bodies in the stacking direction of the plurality of power generation cells, and the rubber seal is interposed between the top parts of the seal bead portions and the MEA member, the method of low temperature starting of the fuel cell system including the warm-up step of warming up the fuel cell stack by introducing the oxygen containing gas, which is discharged from the compressor, into the case interior space between the stack case and the fuel cell stack, in a state in which a temperature of the oxygen containing gas is raised by causing the oxygen containing gas to flow through the pressure loss member, and the electrical power generating step of, after having completed the warm-up step, initiating generation of electrical power, by supplying to the plurality of power generation cells the oxygen containing gas that is discharged from the compressor, together with supplying the fuel gas to the plurality of power generation cells.

In the above-described method of low temperature starting of the fuel cell system, in the warm-up step, the oxygen containing gas may be introduced into the case interior space from the introduction port of the stack case, together with the gas in the case interior space being led out to the exterior of the stack case from the lead out port of the stack case.

In the above-described method of low temperature starting of the fuel cell system, the introduction port may be disposed on the lower part of the stack case, and the lead out port may be disposed on the upper part of the stack case.

In the above-described method of low temperature starting of the fuel cell system, the introduction port may be positioned at a portion between the center of the stack case and the one end part of the stack case in the stacking direction, or at the one end part of the stack case, and the lead out port may be positioned at a portion between the center of the stack case and the other end part of the stack case in the stacking direction, or at the other end part of the stack case.

In the above-described method of low temperature starting of the fuel cell system, the fuel cell system may include the temperature sensor (182) that detects the temperature of the separator member positioned farthest away from the introduction port, the warm-up step may be performed in the case that the temperature (T) detected by the temperature sensor is less than or equal to the temperature threshold value (Ta), and the electrical power generating step may be performed after the detected temperature has become higher than the temperature threshold value.

In the above-described method of low temperature starting of the fuel cell system, the fuel cell system may include the oxygen containing gas discharge flow path that discharges from the fuel cell stack the oxygen containing exhaust gas that has flowed through the plurality of power generation cells, the bypass flow path connecting the oxygen containing gas discharge flow path and the oxygen containing gas supply flow path, and the warm-up introduction passage connecting the bypass flow path and the stack case, wherein, in the warm-up step, the oxygen containing gas discharged from the compressor may be guided to the case interior space via the oxygen containing gas supply flow path, the bypass flow path, and the warm-up introduction passage.

In the above-described method of low temperature starting of the fuel cell system, the bypass valve that opens and closes the bypass flow path may be attached to the bypass flow path, within the bypass flow path, the warm-up introduction passage may be connected between the bypass valve and the oxygen containing gas supply flow path, and in the warm-up step, the bypass valve may be placed in the valve-closed state in which the bypass flow path is blocked.

In the above-described method of low temperature starting of the fuel cell system, the fuel cell system may include the intercooler (156) installed on a more upstream side than the connected portion with the bypass flow path in the oxygen containing gas supply flow path to thereby cool the oxygen containing gas, and the coolant pump (176) that causes the coolant to flow inside the intercooler, wherein driving of the coolant pump may be stopped in the warm-up step, and the coolant pump may be driven in the electrical power generating step.

According to the above-described embodiments, the method of low temperature starting of the fuel cell system is disclosed, the fuel cell system including the fuel cell stack including the cell stack body in which there are stacked the plurality of power generation cells each containing the MEA member that generates electrical power due to the electrochemical reaction between the oxygen containing gas and the fuel gas, and the two separator members arranged on both sides of the MEA member, the first end plate disposed on the one end of the cell stack body, and the second end plate disposed on the other end of the cell stack body, the oxygen containing gas supply flow path that supplies the oxygen containing gas to the fuel cell stack, and the compressor disposed in the oxygen containing gas supply flow path, wherein each of the two separator members includes the metal separator main bodies, the separator main bodies are integrally formed with the seal bead portions in order to prevent leakage of a fluid, which is the oxygen containing gas, the fuel gas, or the coolant, the seal bead portions protrude from the separator main bodies in the stacking direction of the plurality of power generation cells, the rubber seal is interposed between the top parts of the seal bead portions and the MEA member, and each of the plurality of power generation cells includes the oxygen containing gas supply passage through which the oxygen containing gas is supplied to the electrical power generating regions of the plurality of power generation cells, wherein the first end plate includes the oxygen containing gas inlet that introduces the oxygen containing gas from the oxygen containing gas supply flow path into the oxygen containing gas supply passage, the second end plate includes the warm-up oxygen containing gas outlet that delivers out the oxygen containing gas to the exterior of the fuel cell stack from the oxygen containing gas supply passage, and the fuel cell stack further includes the lead out valve that is capable of switching between the first state in which leading out of the oxygen containing gas from the warm-up oxygen containing gas outlet to the exterior of the fuel cell stack is permitted, and the second state in which leading out of the oxygen containing gas from the warm-up oxygen containing gas outlet to the exterior of the fuel cell stack is blocked, the method of low temperature starting of the fuel cell system including the warm-up step of warming up the fuel cell stack by setting the lead out valve in the first state, and allowing the oxygen containing gas discharged from the compressor to flow through the oxygen containing gas supply passage, and after having completed the warm-up step, the electrical power generating step of initiating generation of electrical power, by setting the lead out valve in the second state, and supplying the oxygen containing gas discharged from the compressor to the electrical power generating regions of the plurality of power generation cells, together with supplying the fuel gas to the electrical power generating regions of the plurality of power generation cells.

In the above-described method of low temperature starting of the fuel cell system, the fuel cell system may be equipped with the oxygen containing gas discharge flow path in order to discharge from the fuel cell stack the oxygen containing exhaust gas that has flowed through the plurality of power generation cells, and the back pressure valve (162) that opens and closes the oxygen containing gas discharge flow path, wherein in the warm-up step, the back pressure valve may be placed in a closed state in which the oxygen containing gas discharge flow path is blocked.

What is claimed is:

1. A fuel cell system, comprising:
    a fuel cell stack including a cell stack body including a plurality of power generation cells stacked together, the power generation cells each containing a membrane electrode assembly member configured to generate electrical power due to an electrochemical reaction between an oxygen containing gas and a fuel gas, and two separator members arranged on both sides of the membrane electrode assembly member;
    a stack case in which the fuel cell stack is accommodated;
    an oxygen containing gas supply flow path configured to supply the oxygen containing gas to the fuel cell stack; and
    a compressor disposed in the oxygen containing gas supply flow path;
    wherein each of the two separator members includes a metal separator main body;
    the separator main body is integrally formed with a seal bead portion in order to prevent leakage of a fluid, which is the oxygen containing gas, the fuel gas, or a coolant;
    the seal bead portion protrudes from the separator main body in a stacking direction of the plurality of power generation cells; and
    a rubber seal is interposed between a top part of the seal bead portion and the membrane electrode assembly member;
    the fuel cell system further comprising:
    a warm-up introduction passage configured to introduce the oxygen containing gas, which is discharged from the compressor into the oxygen containing gas supply flow path, into a case interior space between the stack case and the fuel cell stack; and
    a switching unit configured to switch between a first state in which supply of the oxygen containing gas from the oxygen containing gas supply flow path into the fuel cell stack is permitted, together with blocking introduction of the oxygen containing gas from the oxygen containing gas supply flow path into the case interior space via the warm-up introduction passage, and a second state in which supply of the oxygen containing gas from the oxygen containing gas supply flow path into the fuel cell stack is blocked, together with permitting introduction of the oxygen containing gas from the oxygen containing gas supply flow path into the case interior space via the warm-up introduction passage;
    wherein a pressure loss member configured to cause a loss in pressure of the oxygen containing gas flowing through the warm-up introduction passage to be increased is installed in the warm-up introduction passage.

2. The fuel cell system according to claim 1, wherein the pressure loss member includes a throttle section having a flow path cross-sectional area smaller than a flow path cross-sectional area of the oxygen containing gas supply flow path.

3. The fuel cell system according to claim 1, wherein the stack case comprises:
    an introduction port configured to introduce the oxygen containing gas led out from the warm-up introduction passage into the case interior space; and
    a lead out port configured to discharge gas from the case interior space to exterior of the stack case.

4. The fuel cell system according to claim 3, wherein:
    the introduction port is positioned on a lower part of the stack case; and
    the lead out port is positioned on an upper part of the stack case.

5. The fuel cell system according to claim 3, wherein:
    the introduction port is positioned at a portion between a center of the stack case and one end part of the stack case in the stacking direction, or at the one end part of the stack case; and
    the lead out port is positioned at a portion between the center of the stack case and another end part of the stack case in the stacking direction, or at the other end part of the stack case.

6. The fuel cell system according to claim 3, wherein an opening of the introduction port in communication with the case interior space faces toward the cell stack body.

7. The fuel cell system according to claim 1, further comprising:
    an oxygen containing gas discharge flow path configured to discharge from the fuel cell stack an oxygen containing exhaust gas that has flowed through the plurality of power generation cells;
    a bypass flow path configured to connect the oxygen containing gas discharge flow path and the oxygen containing gas supply flow path; and
    a bypass valve configured to open and close the bypass flow path;
    wherein the bypass flow path includes:
    a first end part connected to the oxygen containing gas supply flow path; and
    a second end part connected to the oxygen containing gas discharge flow path; and
    the warm-up introduction passage is connected to a portion of the bypass flow path between the bypass valve and the first end part.

8. The fuel cell system according to claim 1, wherein the rubber seal is constituted from a porous fluororubber.

9. A fuel cell system, comprising:
    a fuel cell stack including: a cell stack body including a plurality of power generation cells stacked together, the power generation cells each containing a membrane electrode assembly member configured to generate electrical power due to an electrochemical reaction between an oxygen containing gas and a fuel gas, and two separator members arranged on both sides of the membrane electrode assembly member; a first end plate disposed on one end of the cell stack body; and a second end plate disposed on another end of the cell stack body;

an oxygen containing gas supply flow path configured to supply the oxygen containing gas to the fuel cell stack; and
a compressor disposed in the oxygen containing gas supply flow path;
wherein each of the two separator members includes a metal separator main body;
the separator main body is integrally formed with a seal bead portion in order to prevent leakage of a fluid, which is the oxygen containing gas, the fuel gas, or a coolant;
the seal bead portion protrudes from the separator main body in a stacking direction of the plurality of power generation cells;
a rubber seal is interposed between a top part of the seal bead portion and the membrane electrode assembly member; and
each of the plurality of power generation cells includes an oxygen containing gas supply passage through which the oxygen containing gas is supplied to electrical power generating regions of the plurality of power generation cells;
wherein the first end plate comprises an oxygen containing gas inlet configured to introduce the oxygen containing gas from the oxygen containing gas supply flow path into the oxygen containing gas supply passage;
the second end plate comprises a warm-up oxygen containing gas outlet configured to deliver out the oxygen containing gas to exterior of the fuel cell stack from the oxygen containing gas supply passage; and
the fuel cell stack further includes a lead out valve configured to switch between a first state in which leading out of the oxygen containing gas from the warm-up oxygen containing gas outlet to the exterior of the fuel cell stack is permitted, and a second state in which leading out of the oxygen containing gas from the warm-up oxygen containing gas outlet to the exterior of the fuel cell stack is blocked.

10. A method of low temperature starting of a fuel cell system, the fuel cell system comprising:
a fuel cell stack including a cell stack body including a plurality of power generation cells stacked together, the power generation cells each containing a membrane electrode assembly member configured to generate electrical power due to an electrochemical reaction between an oxygen containing gas and a fuel gas, and two separator members arranged on both sides of the membrane electrode assembly member;
a stack case in which the fuel cell stack is accommodated;
an oxygen containing gas supply flow path configured to supply the oxygen containing gas to the fuel cell stack; and
a compressor disposed in the oxygen containing gas supply flow path;
wherein each of the two separator members includes a metal separator main body;
the separator main body is integrally formed with a seal bead portion in order to prevent leakage of a fluid, which is the oxygen containing gas, the fuel gas, or a coolant;
the seal bead portion protrudes from the separator main body in a stacking direction of the plurality of power generation cells; and
a rubber seal is interposed between a top part of the seal bead portion and the membrane electrode assembly member;

the method of low temperature starting of the fuel cell system comprising:
a warm-up step of warming up the fuel cell stack, by introducing the oxygen containing gas, which is discharged from the compressor, into a case interior space between the stack case and the fuel cell stack in a state in which a temperature of the oxygen containing gas is raised by causing the oxygen containing gas to flow through a pressure loss member; and
an electrical power generating step of, after having completed the warm-up step, initiating generation of electrical power, by supplying to the plurality of power generation cells the oxygen containing gas that is discharged from the compressor, together with supplying the fuel gas to the plurality of power generation cells.

11. The method of low temperature starting of the fuel cell system according to claim 10, wherein, in the warm-up step, the oxygen containing gas is introduced into the case interior space from an introduction port of the stack case, together with a gas in the case interior space being led out to exterior of the stack case from a lead out port of the stack case.

12. The method of low temperature starting of the fuel cell system according to claim 11, wherein:
the introduction port is positioned on a lower part of the stack case; and
the lead out port is positioned on an upper part of the stack case.

13. The method of low temperature starting of the fuel cell system according to claim 11, wherein:
the introduction port is positioned at a portion between a center of the stack case and one end part of the stack case in the stacking direction, or at the one end part of the stack case; and
the lead out port is positioned at a portion between the center of the stack case and another end part of the stack case in the stacking direction, or at the other end part of the stack case.

14. The method of low temperature starting of the fuel cell system according to claim 11, wherein:
the fuel cell system includes a temperature sensor configured to detect a temperature of the separator member positioned farthest away from the introduction port;
the warm-up step is performed in a case that the temperature detected by the temperature sensor is less than or equal to a temperature threshold value; and
the electrical power generating step is performed after the detected temperature has become higher than the temperature threshold value.

15. The method of low temperature starting of the fuel cell system according to claim 10, wherein the fuel cell system comprises:
an oxygen containing gas discharge flow path configured to discharge from the fuel cell stack an oxygen containing exhaust gas that has flowed through the plurality of power generation cells;
a bypass flow path configured to connect the oxygen containing gas discharge flow path and the oxygen containing gas supply flow path; and
a warm-up introduction passage configured to connect the bypass flow path and the stack case;
wherein, in the warm-up step, the oxygen containing gas discharged from the compressor is guided to the case interior space via the oxygen containing gas supply flow path, the bypass flow path, and the warm-up introduction passage.

16. The method of low temperature starting of the fuel cell system according to claim 15, wherein:
- a bypass valve configured to open and close the bypass flow path is attached to the bypass flow path;
- within the bypass flow path, the warm-up introduction passage is connected between the bypass valve and the oxygen containing gas supply flow path; and
- in the warm-up step, the bypass valve is placed in a valve-closed state in which the bypass flow path is blocked.

17. The method of low temperature starting of the fuel cell system according to claim 15, wherein the fuel cell system comprises:
- an intercooler installed on a more upstream side than a connected portion with the bypass flow path in the oxygen containing gas supply flow path to thereby cool the oxygen containing gas; and
- a coolant pump configured to cause a coolant to flow inside the intercooler;
- wherein driving of the coolant pump is stopped in the warm-up step; and
- the coolant pump is driven in the electrical power generating step.

* * * * *